US012394003B2

(12) United States Patent
Grube

(10) Patent No.: US 12,394,003 B2
(45) Date of Patent: *Aug. 19, 2025

(54) PATENT LICENSING DISTRIBUTED LEDGER INFRASTRUCTURE AND METHOD THEREOF

(71) Applicant: Caerus Institute LLC, Barrington, IL (US)

(72) Inventor: Gary W. Grube, Barrington Hills, IL (US)

(73) Assignee: Caerus Institute LLC, Barrington, IL (US)

( * ) Notice: Subject to any disclaimer, the term of this patent is extended or adjusted under 35 U.S.C. 154(b) by 248 days.

This patent is subject to a terminal disclaimer.

(21) Appl. No.: 17/522,948

(22) Filed: Nov. 10, 2021

(65) Prior Publication Data

US 2023/0145257 A1 May 11, 2023

Related U.S. Application Data

(60) Provisional application No. 63/276,120, filed on Nov. 5, 2021.

(51) Int. Cl.
G06Q 50/18 (2012.01)
G06F 21/10 (2013.01)
H04L 9/32 (2006.01)

(52) U.S. Cl.
CPC ......... *G06Q 50/184* (2013.01); *G06F 21/105* (2013.01); *H04L 9/3236* (2013.01);
(Continued)

(58) Field of Classification Search
CPC . G06Q 50/184; G06Q 2220/18; H04L 9/3236
See application file for complete search history.

(56) References Cited

U.S. PATENT DOCUMENTS 12,008,669 B2 * 6/2024 Grube ............... H04L 9/3236
2002/0004775 A1 * 1/2002 Kossovsky .......... G06Q 10/10
705/26.1

(Continued)

FOREIGN PATENT DOCUMENTS

WO WO-2018031703 A1 * 2/2018 ............. G06F 21/16
WO WO-2019083837 A2 * 5/2019 ......... G06F 16/2379

OTHER PUBLICATIONS

Bamakan, S.M.H., Nezhadsistani, N., Bodaghi, O. et al. Patents and intellectual property assets as non-fungible tokens; key technologies and challenges. Sci Rep 12, 2178 (2022); accessed Apr. 9, 2025. https://doi.org/10.1038/s41598-022-05920-6 (Year: 2022).*

*Primary Examiner* — Andrew Chase Lakhani
(74) *Attorney, Agent, or Firm* — Gary W. Grube

(57) ABSTRACT

A method includes a computing device of a computing infrastructure interpreting a request from a patent owner computing device to make available for licensing a set of patents to produce patent basics of a smart contract for the set of patents, The method further includes verifying, with a patent issuance computing device of the computing infrastructure, validity of the patent basics. When the patent basics are valid, the method further includes establishing available license terms of the smart contract for the set of patents, establishing available payment terms of the smart contract for the set of patents, and causing generation of a non-fungible token associated with the smart contract in the patent distributed ledger.

15 Claims, 16 Drawing Sheets

(52) U.S. Cl.
CPC .......... *H04L 9/3247* (2013.01); *H04L 9/3263* (2013.01); *G06Q 2220/18* (2013.01)

(56) References Cited

U.S. PATENT DOCUMENTS

| | | | |
|---|---|---|---|
| 2017/0193619 A1* | 7/2017 | Rollins | G06Q 50/184 |
| 2018/0285996 A1* | 10/2018 | Ma | H04L 9/0637 |
| 2019/0005595 A1* | 1/2019 | Tautenhan | H04L 9/3236 |
| 2019/0114395 A1* | 4/2019 | Lenchner | H04L 9/3239 |
| 2019/0182053 A1* | 6/2019 | Varpiola | H04L 9/3247 |
| 2020/0005284 A1 | 1/2020 | Vijayan | |
| 2020/0160320 A1 | 5/2020 | Williams et al. | |
| 2020/0160465 A1* | 5/2020 | Spangenberg | G06Q 20/389 |
| 2020/0213121 A1* | 7/2020 | Hioki | H04L 9/3239 |
| 2020/0327629 A1* | 10/2020 | Spangenberg | G06Q 50/184 |
| 2021/0012331 A1* | 1/2021 | Higgins | G06Q 20/3829 |
| 2021/0035246 A1* | 2/2021 | Schouppe | H04L 9/3239 |
| 2021/0082044 A1* | 3/2021 | Sliwka | H04L 9/3255 |
| 2021/0201336 A1 | 7/2021 | Mallett et al. | |
| 2021/0256070 A1* | 8/2021 | Tran | G06F 16/90332 |
| 2021/0295324 A1 | 9/2021 | Kerseboom et al. | |
| 2021/0304196 A1 | 9/2021 | Patterson | |
| 2021/0314395 A1* | 10/2021 | Basu | G06Q 20/0658 |
| 2021/0326856 A1* | 10/2021 | Yantis | G06Q 20/40 |
| 2021/0326872 A1 | 10/2021 | Robotham et al. | |
| 2023/0177480 A1* | 6/2023 | Spangenberg | G06Q 20/1235 705/65 |

* cited by examiner

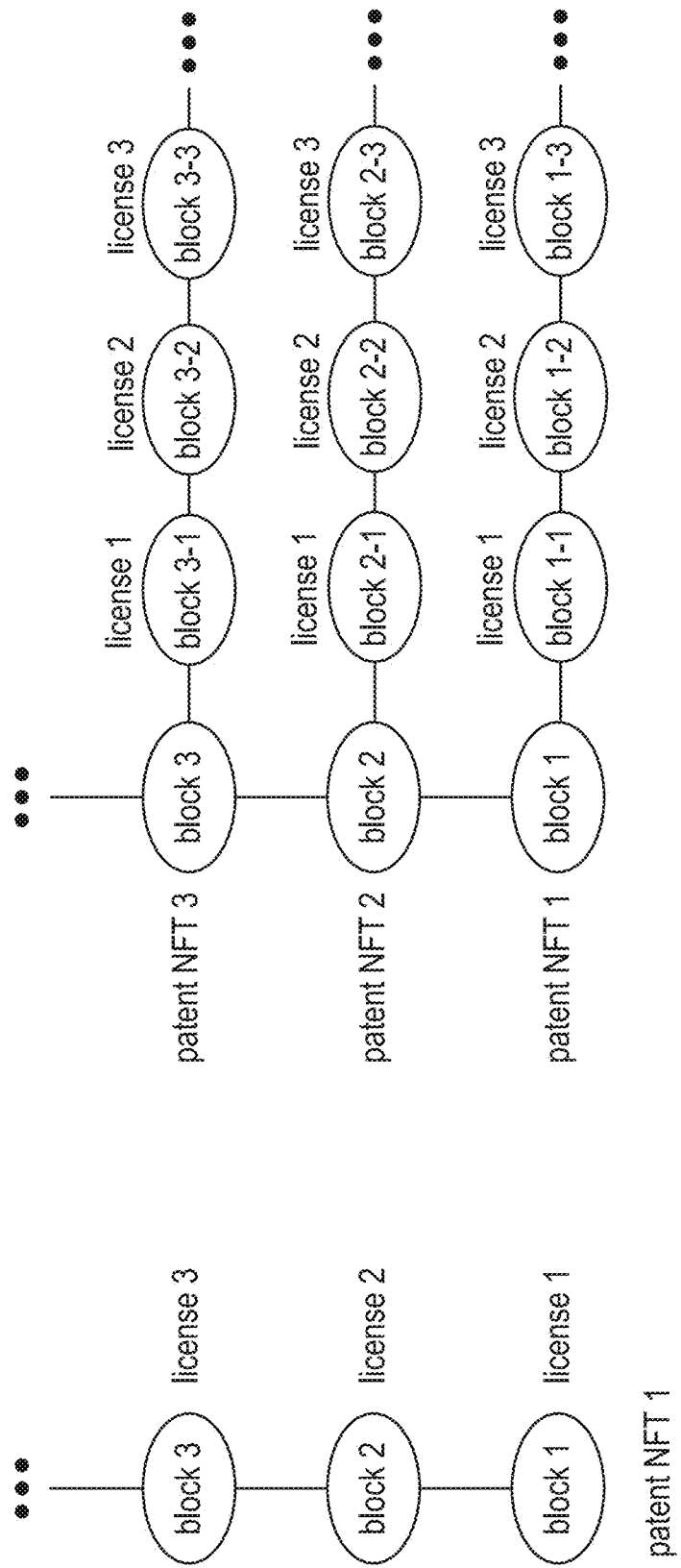

PATENT LICENSING DISTRIBUTED LEDGER INFRASTRUCTURE AND METHOD THEREOF

CROSS-REFERENCE TO RELATED APPLICATIONS

The present U.S. Utility Patent Application claims priority pursuant to 35 U.S.C. § 119(e) to U.S. Provisional Application No. 63/276,120, entitled "PATENT LICENSING DISTRIBUTED LEDGER INFRASTRUCTURE AND METHOD THEREOF" filed Nov. 5, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to systems and infrastructures that utilize technology described in patents and more particularly to automatically licensing patents to enable usage of the patented technology.

Description of Related Art

Usage of patented technology includes drafting and computing license agreements manually. Such licensing agreements can be quite complex and time-consuming to draft and execute. Non-fungible token based distributed ledgers are becoming popular to provide clear title to assets. A need exists to improve the ability to license the technology of patents to solve these problems.

BRIEF DESCRIPTION OF THE SEVERAL VIEWS OF THE DRAWING(S)

FIGS. 1B and 1C are schematic block diagrams of organization of patent distributed ledgers in accordance with the present invention;

Figure 6A:
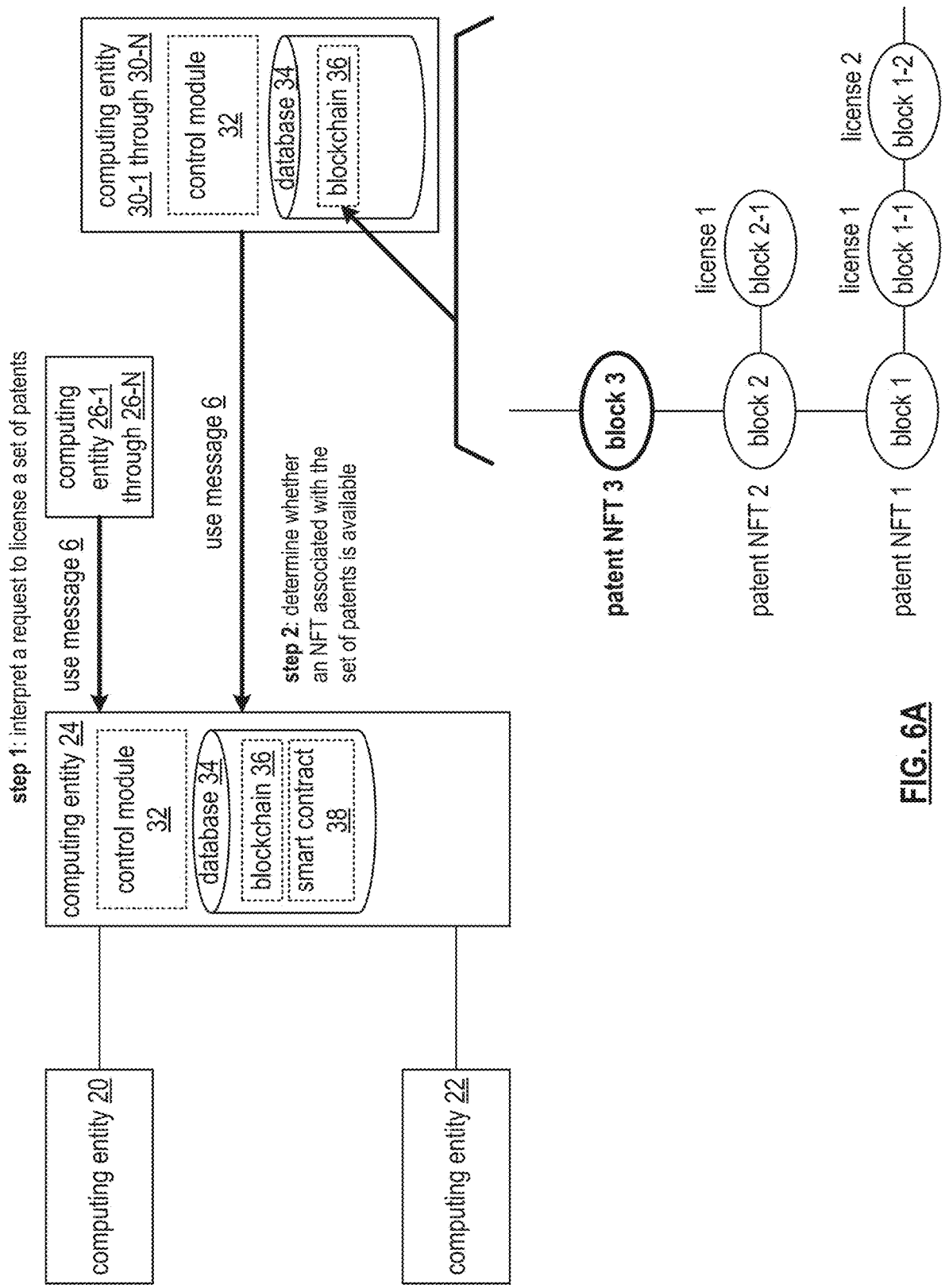
Figure 6B:
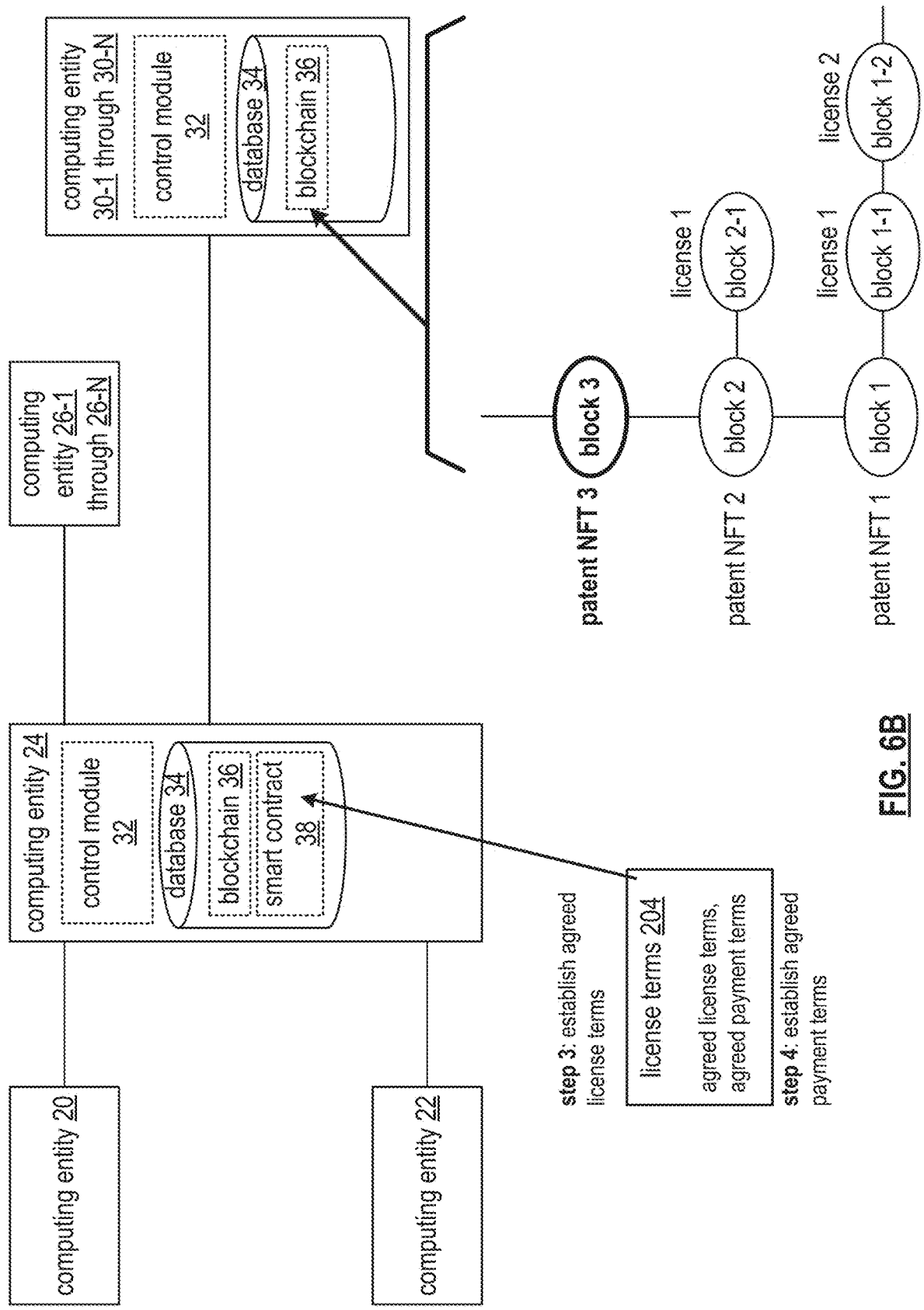
Figure 6C:
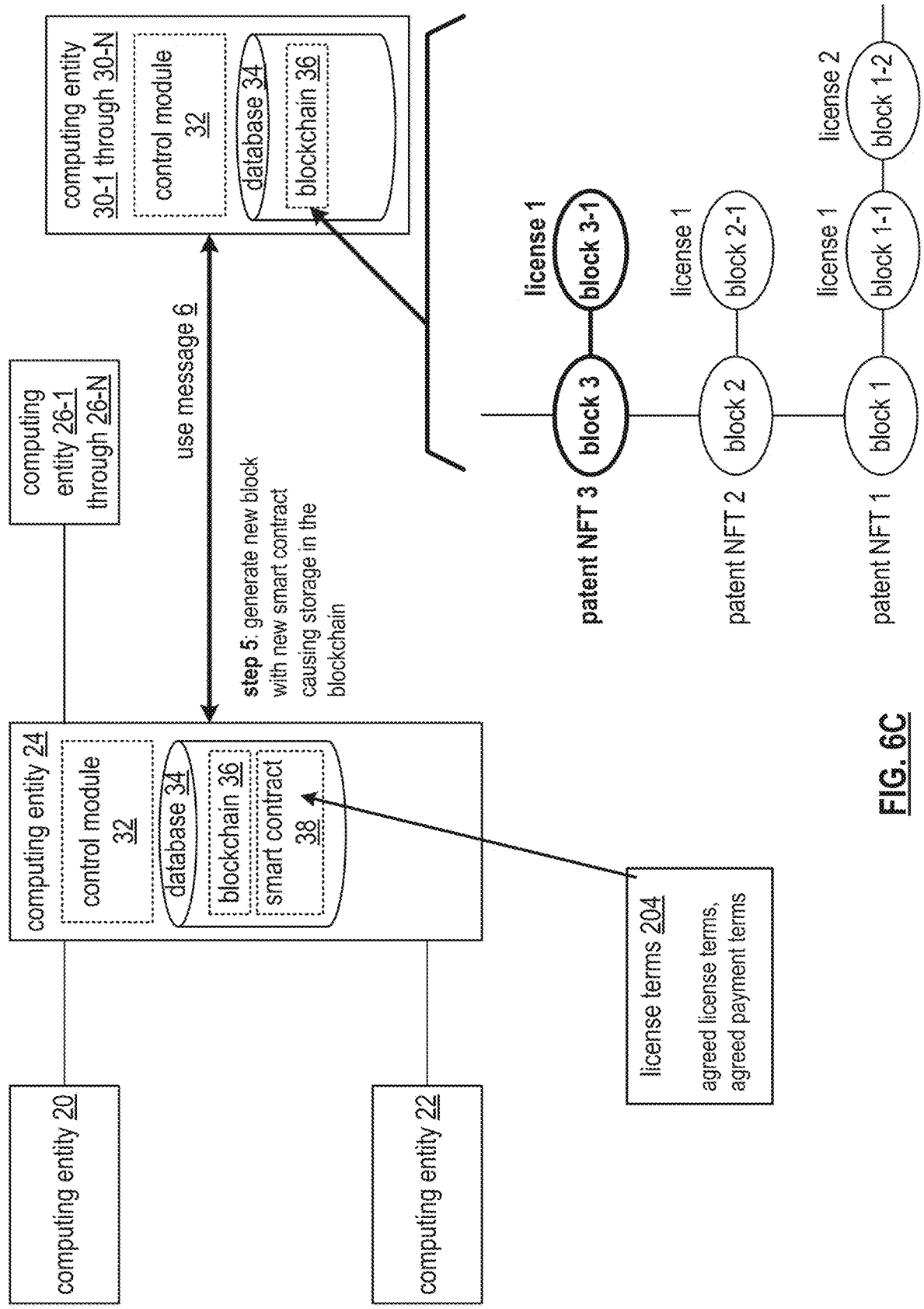
Figure 7A:
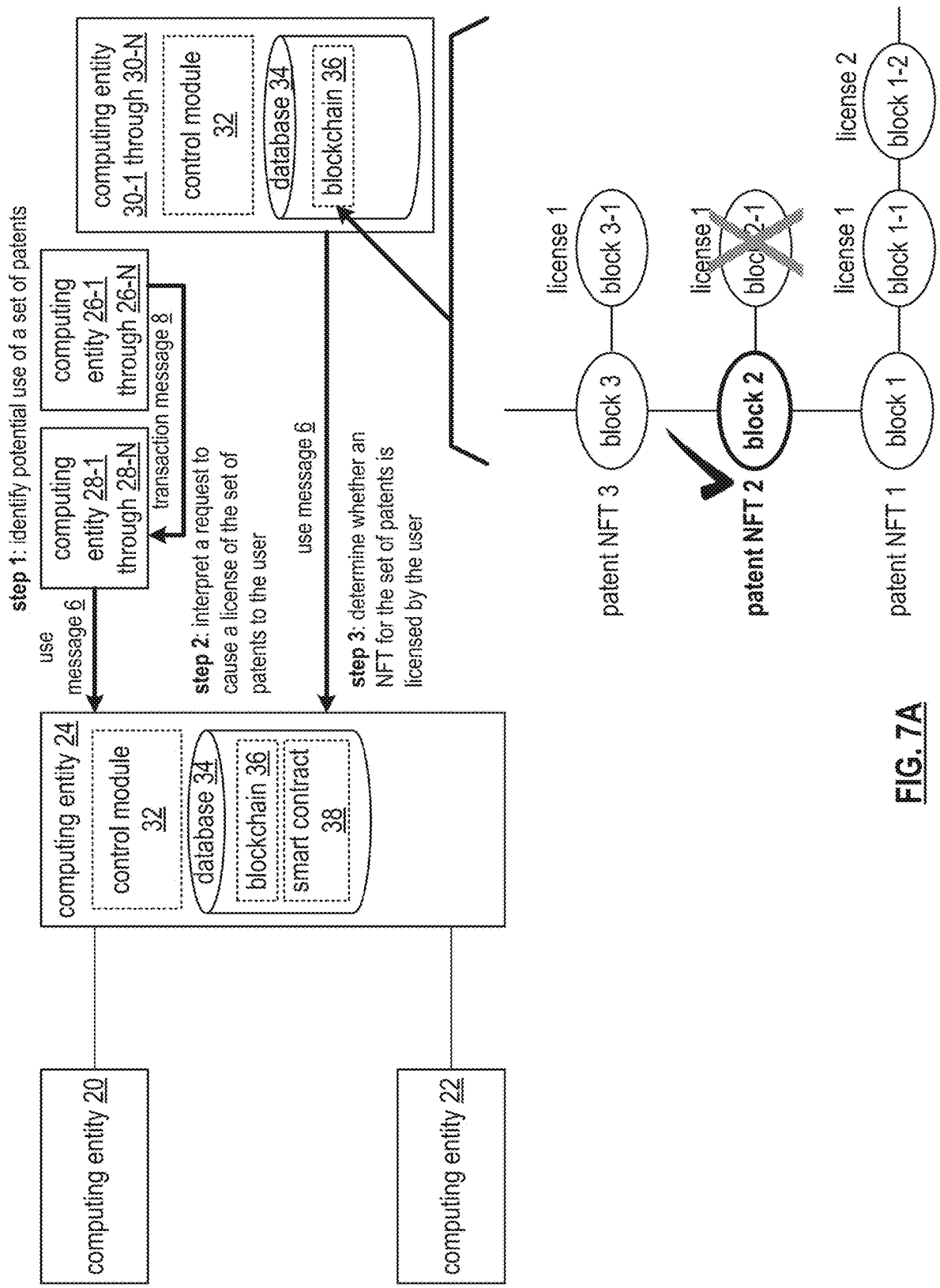
Figure 7B:
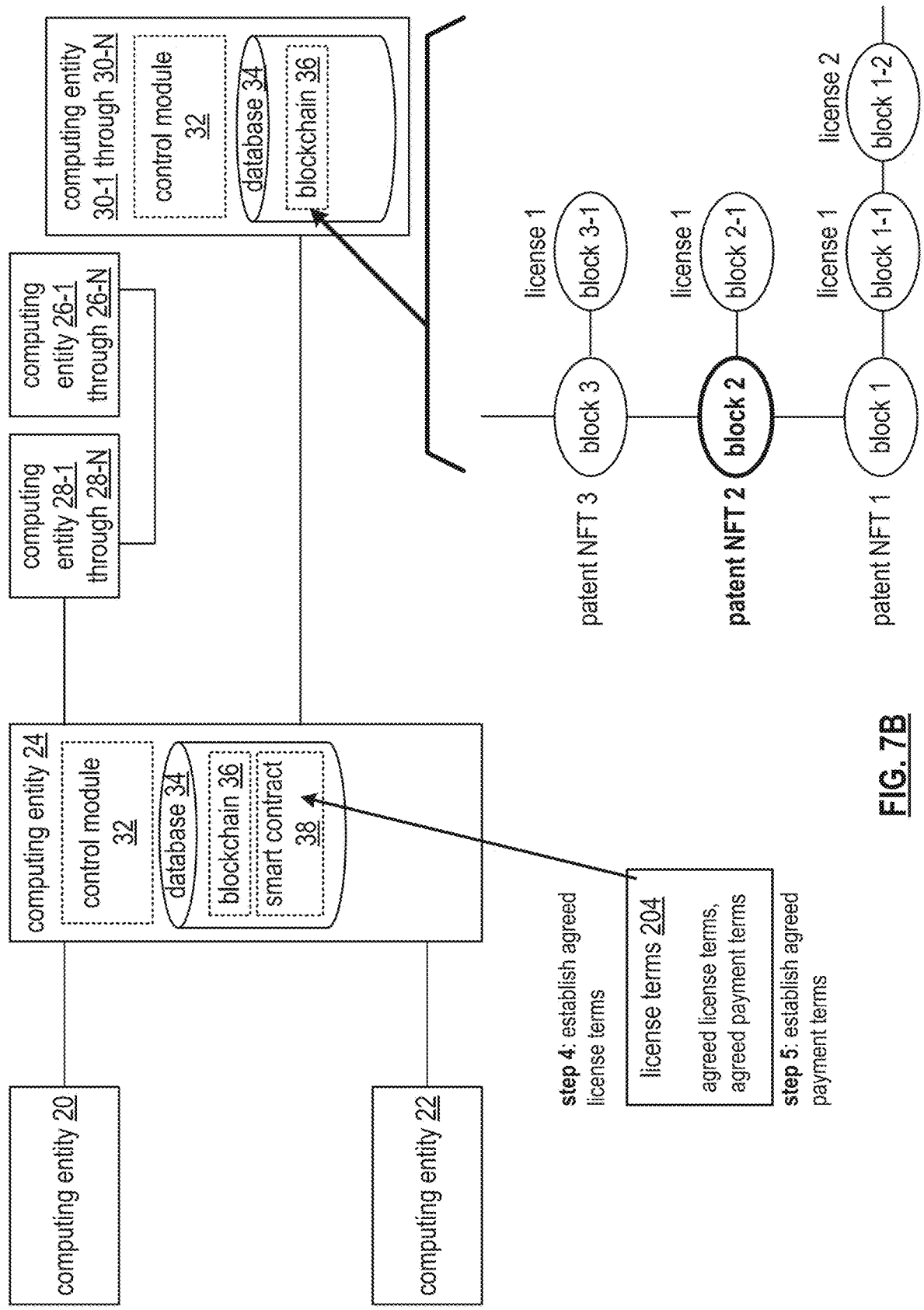
Figure 7C:
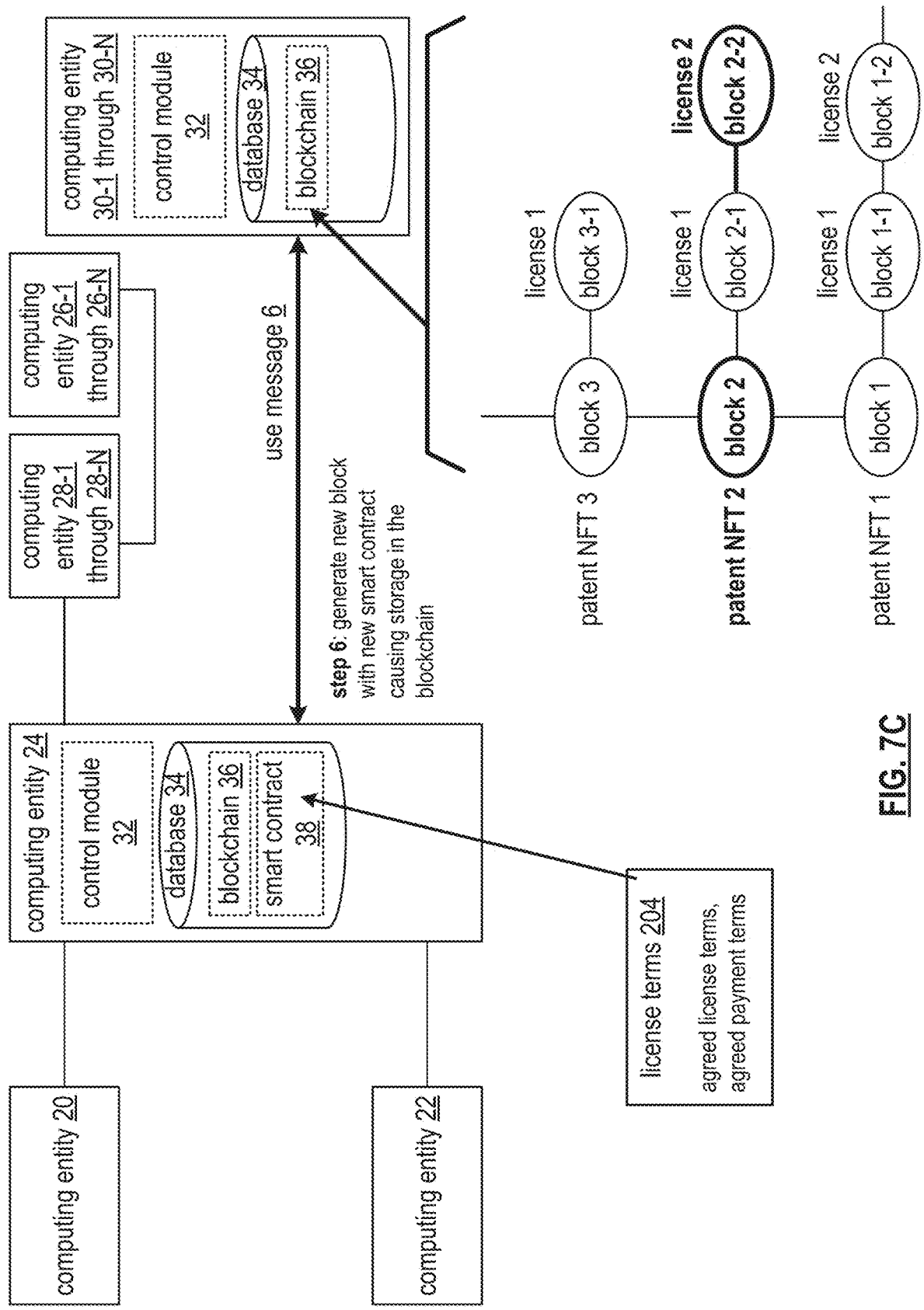

FIGS. 6A-6C are schematic block diagrams of an embodiment of a computing infrastructure illustrating an example of establishing a license for a set of patents in accordance with the present invention; and FIGS. 7A-7C are schematic block diagrams of an embodiment of a computing infrastructure illustrating another example of establishing a license for a set of patents in accordance with the present invention.

DETAILED DESCRIPTION OF THE INVENTION

Figure 1A:
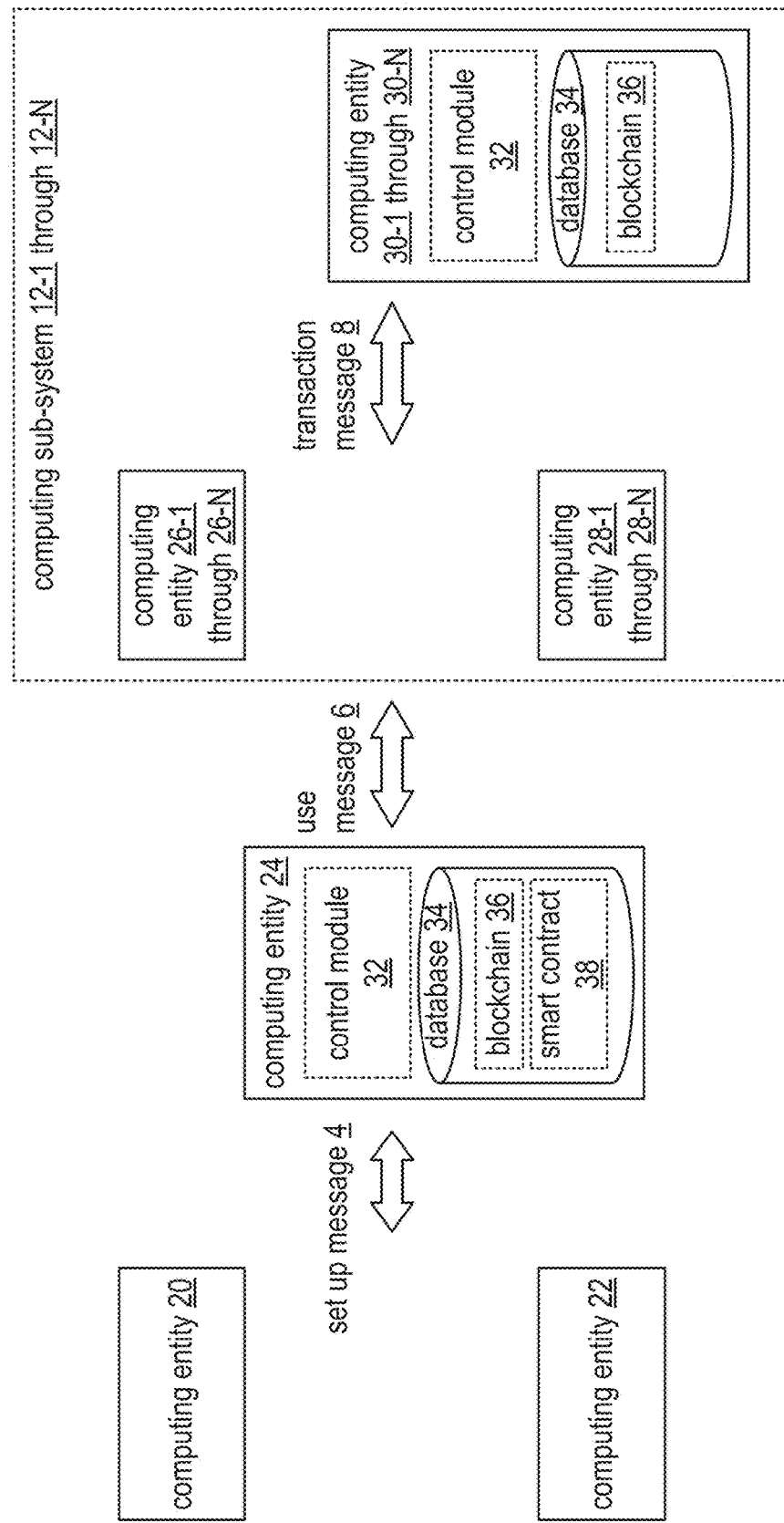
FIG. 1A is a schematic block diagram of an embodiment of a computing infrastructure in accordance with the present invention.

FIG. 1A is a schematic block diagram of an embodiment of a computing infrastructure 10 that includes computing entities 20, 22, 24, and computing sub-systems 12-1 through 12-N. The computing sub-systems includes computing entities 26-1 through 26-N, computing entities 28-1 through 28-N, and computing entities 30-1 through 30-N. Each computing entity of the computing infrastructure includes a control module 32 and a database 34. Among other things, the database 34 is utilized to store at least one representation of a blockchain 36 and at least one representation of a smart contract 38.

In an embodiment, each computing and sub-system corresponds to a specialty coalition around a market type or other. For example, a first computing sub-system 12-1 is associated with a payment system, a second computing sub-system 12-2 is associated with a supply chain system. Other market type examples include transportation, agriculture, finance, investing, government, education, research, etc.

In an example embodiment, the computing entity 20 is associated with a patent owner computing device, the computing entity 22 is associated with a patent office computing device, and the computing entity 24 is associated with a broker computing device. Further in the example embodiment, the computing entities 26-1 through 26-N are associated with user computing devices and the computing entities 28-1 through 28-N are associated with reporting computing devices of one of the computing sub-systems 12-1 through 12-N. Still further in the example embodiment, the computing entities 30-1 through 30-N are associated with blockchain nodes and serve one or more of the computing sub-system 12-1 through 12-N. Such blockchain nodes store, manipulate, and verified blockchains that provide immutable ledgers for crypto currencies, non-fungible tokens, and other assets.

The computing entities of the computing infrastructure 10 communicate with each other by way of one or more private intranets and one or more public internets. Generally, the computing entity 24, when operating as the broker computing device, communicates setup messages 4 with the computing entity 20, when operating as the patent owner computing device, and communicates further setup messages 4 with the computing entity 22, when operating as the patent office computing device. The setup messages 4 includes various messages to register patents for licensing as is described below.

Further generally, the computing entity 24 communicates use messages 6 with the computing sub-systems, where the use messages 6 establish a patent license and facilitate utilization of the patent license. Still further generally, the computing entities 30-1 through 30-N of the various blockchains communicate transaction messages 8 with the computing entities 26-1 through 26-N, when operating as the user computing devices, and communicate the transaction messages 8 with the computing entities 28-1 through 28-N, when operating as the reporting computing devices. The transaction messages 8 carry out activities that rely on the use of licensed patents.

In an example of operation, the computing entity 20 exchanges setup messages 4 with the computing entity 24 to request that a new nonfungible token be added to a patent ledger for a set of patents to be licensed. The computing entity 24 exchanges setup messages 4 with the computing entity 22 to verify (e.g., with a governmental patent office) validity of the patents to be licensed. When validated, the computing entity 24 exchanges use messages 6 with at least some of the computing entities 30-1 through 30-N to add the new non-fungible token for the set of patents to a patent ledger stored by the blockchain nodes.

In another example of operation, the computing entity 26-1 exchanges use messages 6 with the computing entity 24 to request utilization of technology of a set of patents. The computing entity 24 generates a smart contract in accordance with previous smart contract guidance associated with the set of patents. The computing entity 24 exchanges use messages 6 with one or more of the computing entities 30-1 through 30-N to add a new smart contract to an existing patent distributed ledger.

In yet another example of operation, the computing entity 28-1 determines that the computing entity 26-1 is likely to require a license to utilize technology of the set of patents. The computing entity 28-1 exchanges use messages 6 with the computing entity 24 to initiate establishment of a license of the technology of the set of patents for the computing entity 26-1 when such a license had not previously existed for the computing entity 26-1. The computing entity 24 exchanges use messages 6 with one or more of the computing entities 30-1 through 30-N to add a new smart contract to an existing patent distributed ledger.

FIGS. 1B and 1C are schematic block diagrams of organization of patent distributed ledgers. FIG. 1B illustrates an example where a single blockchain serves as the patent distributed ledger linking a series of blocks of the blockchain, where each block is associated with a different license for a set of patents associated with a non-fungible token. FIG. 1C illustrates another example where a first blockchain links a series of blocks of different non-fungible tokens for different sets of patents. Each block forms a blockchain of its own where each further block of its own is associated with a different license for the set of patents of the non-fungible token.

Figure 1D:
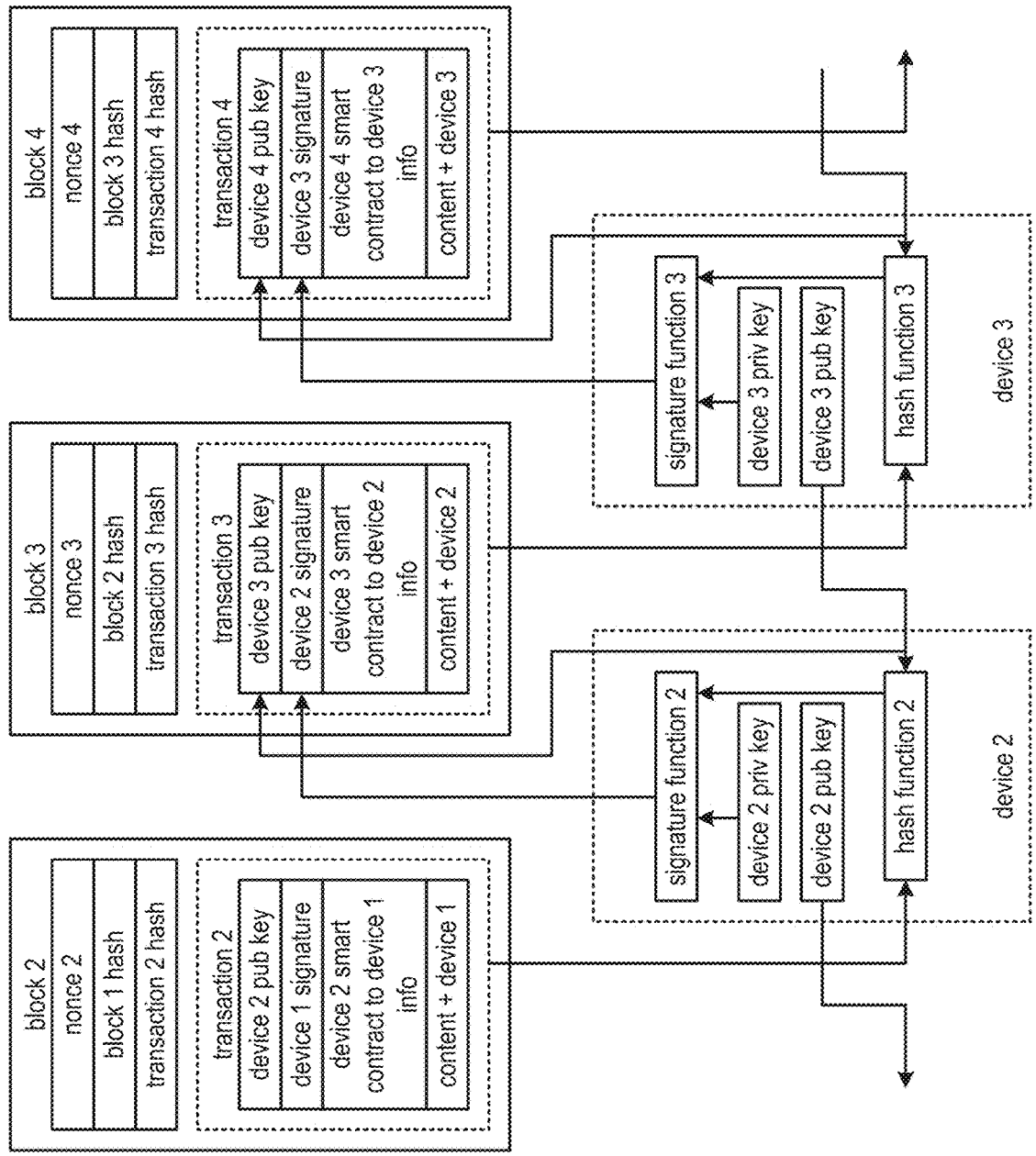
FIG. 1D is a schematic block diagram of an embodiment of a blockchain associated with a patent distributed ledger in accordance with the present invention.

FIG. 1D is a schematic block diagram of an embodiment of content blockchain of a patent distributed ledger, where the content includes the smart contract as previously discussed. The content blockchain includes a plurality of blocks 2-4. Each block includes a header section and a transaction section. The header section includes one or more of a nonce, a hash of a preceding block of the blockchain, where the preceding block was under control of a preceding device (e.g., a broker computing device, a user computing device, a blockchain node computing device, etc.) in a chain of control of the blockchain, and a hash of a current block (e.g., a current transaction section), where the current block is under control of a current device in the chain of control of the blockchain.

The transaction section includes one or more of a public key of the current device, a signature of the preceding device, smart contract content, change of control from the preceding device to the current device, and content information from the previous block as received by the previous device plus content added by the previous device when transferring the current block to the current device.

FIG. 1D further includes devices 2-3 to facilitate illustration of generation of the blockchain. Each device includes a hash function, a signature function, and storage for a public/private key pair generated by the device.

An example of operation of the generating of the blockchain, when the device 2 has control of the blockchain and is passing control of the blockchain to the device 3 (e.g., the device 3 is transacting a transfer of content from device 2), the device 2 obtains the device 3 public key from device 3, performs a hash function 2 over the device 3 public key and the transaction 2 to produce a hashing resultant (e.g., preceding transaction to device 2) and performs a signature function 2 over the hashing resultant utilizing a device 2 private key to produce a device 2 signature.

Having produced the device 2 signature, the device 2 generates the transaction 3 to include the device 3 public key, the device 2 signature, device 3 content request to 2 information, and the previous content plus content from device 2. The device 3 content request to device 2 information includes one or more of a detailed content request, a query request, background content, and specific instructions from device 3 to device 2 for access to a patent license. The previous content plus content from device 2 includes one or more of content from an original source, content from any subsequent source after the original source, an identifier of a source of content, a serial number of the content, an expiration date of the content, content utilization rules, and results of previous blockchain validations.

Having produced the transaction 3 section of the block 3 a processing module (e.g., of the device 2, of the device 3, of a transaction mining server, of another server, generates the header section by performing a hashing function over the transaction section 3 to produce a transaction 3 hash, performing the hashing function over the preceding block (e.g., block 2) to produce a block 2 hash. The performing of the hashing function may include generating a nonce such that when performing the hashing function to include the nonce of the header section, a desired characteristic of the resulting hash is achieved (e.g., a desired number of preceding zeros is produced in the resulting hash).

Having produced the block 3, the device 2 sends the block 3 to the device 3, where the device 3 initiates control of the blockchain. Having received the block 3, the device 3 validates the received block 3. The validating includes one or more of verifying the device 2 signature over the preceding transaction section (e.g., transaction 2) and the device 3 public key utilizing the device 2 public key (e.g., a re-created signature function result compares favorably to device 2 signature) and verifying that an extracted device 3 public key of the transaction 3 compares favorably to the device 3 public key held by the device 3. The device 3 considers the received block 3 validated when the verifications are favorable (e.g., the authenticity of the associated content is trusted).

Figure 1E:
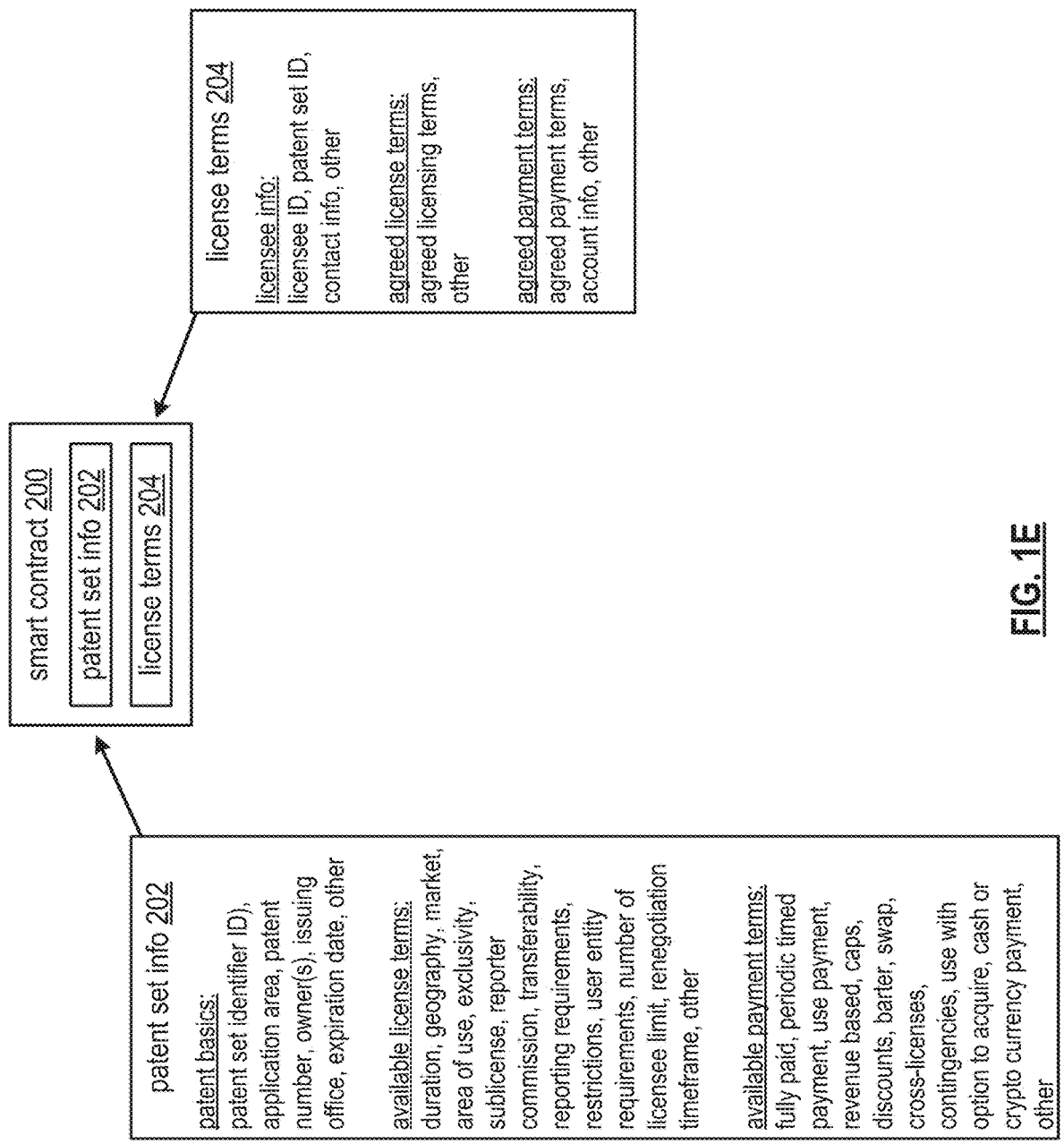
FIG. 1E is a schematic block diagram of a data structure for a smart contract in accordance with the present invention.

FIG. 1E is a schematic block diagram of a data structure for a smart contract 200 that includes patent set information 202 and license terms 204. The patent set information 202 includes patent basics, available license terms, and available patent terms. FIG. 1E illustrates examples of each category of the patent set information 202.

The license terms 204 includes licensee information, agreed license terms, and agreed payment terms. FIG. 1E further illustrates examples of each of the categories of the license terms 204.

Figure 2A:
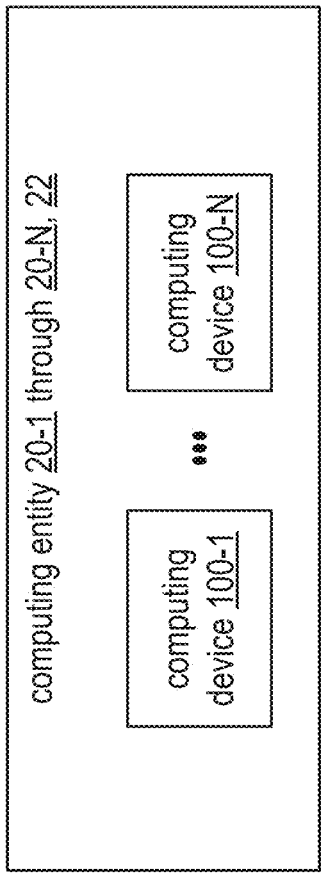
FIG. 2A is a schematic block diagram of an embodiment of a computing entity of a computing system in accordance with the present invention.

FIG. 2A is a schematic block diagram of an embodiment of the computing entity (e.g., 20, 22, 24, 26-1 through 26-N, 28-1 through 28-N, and 30-1 through 30-N) of the computing infrastructure of FIG. 1. The computing entity includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
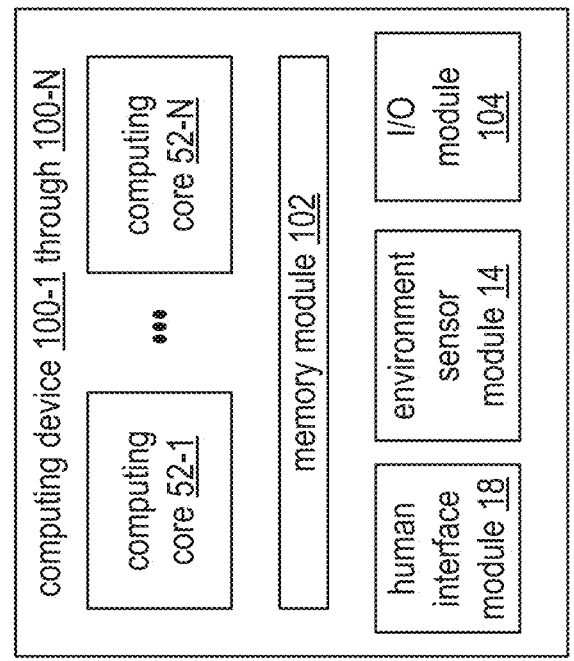
FIG. 2B is a schematic block diagram of an embodiment of a computing device of a computing system in accordance with the present invention.

FIG. 2B is a schematic block diagram of an embodiment of a computing device (e.g., 100-1 through 100-N) of the computing entity of FIG. 2A that includes one or more computing cores 52-1 through 52-N, a memory module 102, a human interface module 18, an environment sensor module 14, and an input/output (I/O) module 104. In alternative embodiments, the human interface module 18, the environment sensor module 14, the I/O module 104, and the memory module 102 may be standalone (e.g., external to the computing device). An embodiment of the computing device is discussed in greater detail with reference to FIG. 3.

Figure 3:
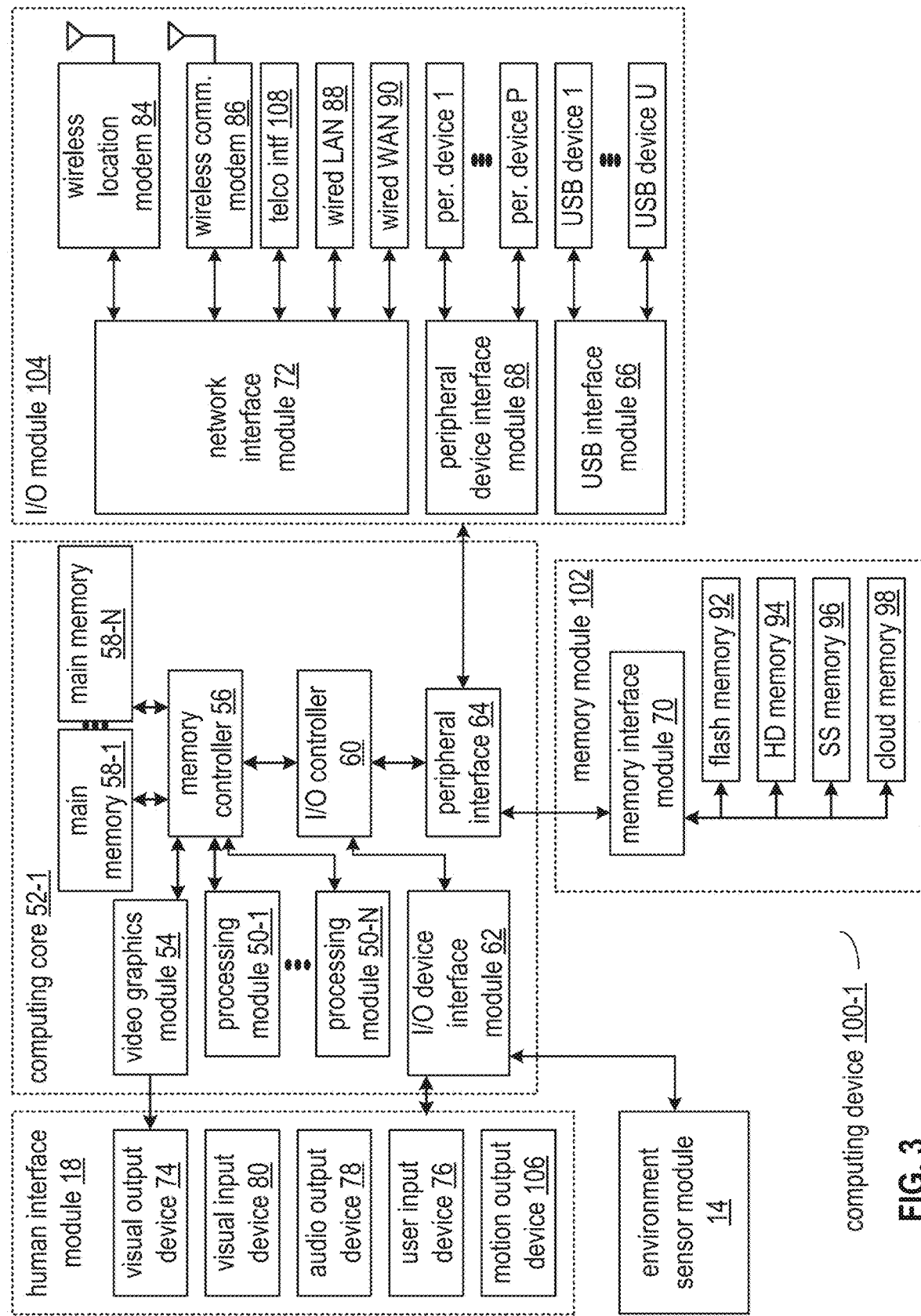
FIG. 3 is a schematic block diagram of another embodiment of a computing device of a computing system in accordance with the present invention.

FIG. 3 is a schematic block diagram of another embodiment of the computing device 100-1 of the mechanical and computing infrastructure of FIG. 1 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100-1 may include more or less devices and modules than shown in this example embodiment.

Figure 4:
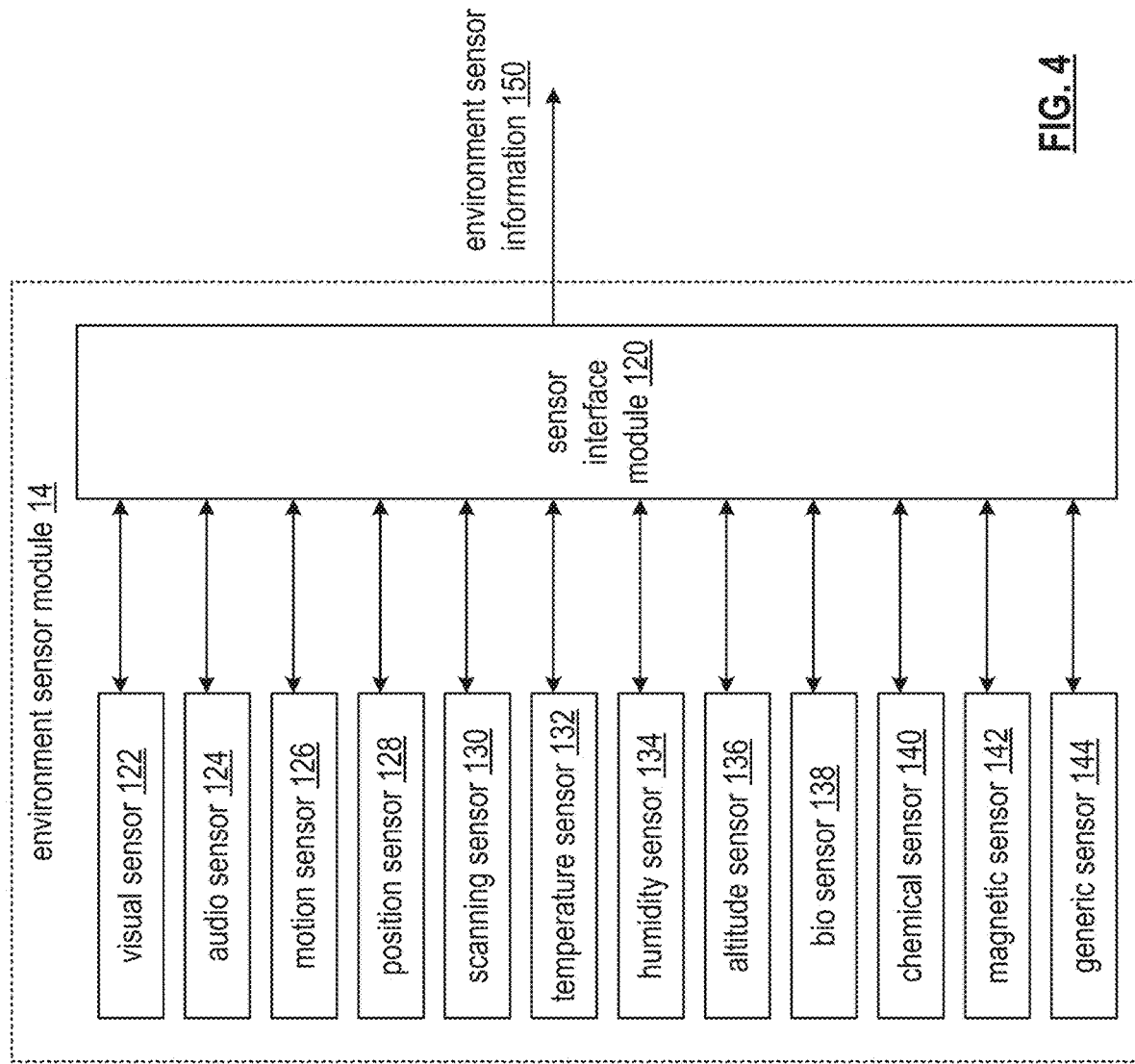
FIG. 4 is a schematic block diagram of an embodiment of an environment sensor module of a computing system in accordance with the present invention.

FIG. 4 is a schematic block diagram of an embodiment of the environment sensor module 14 of the computing device of FIG. 2B that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, Mill, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
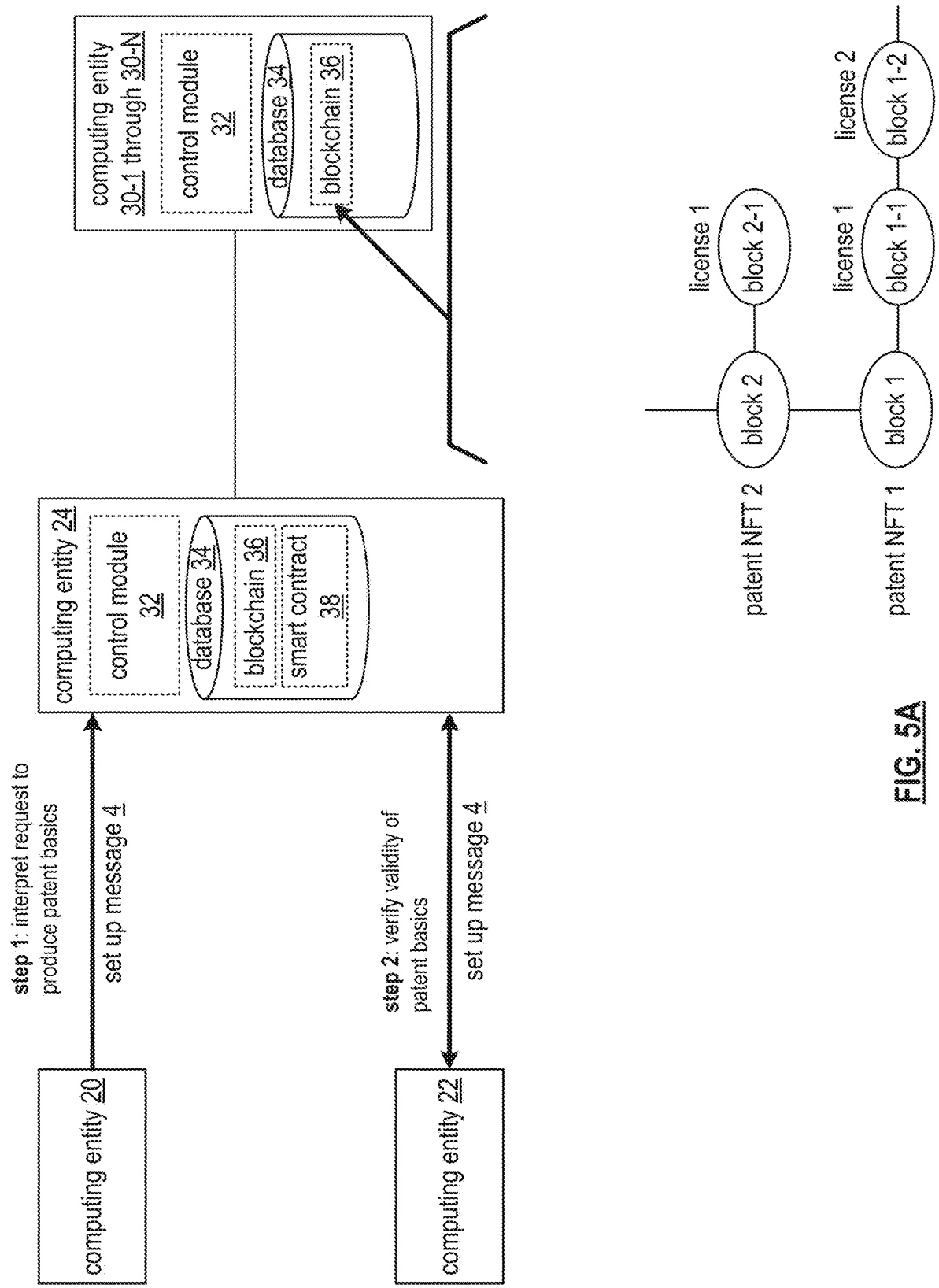
FIGS. 5A-5C are schematic block diagrams of an embodiment of a computing infrastructure illustrating an example of establishing a non-fungible token for a set of patents in accordance with the present invention.
Figure 5B:
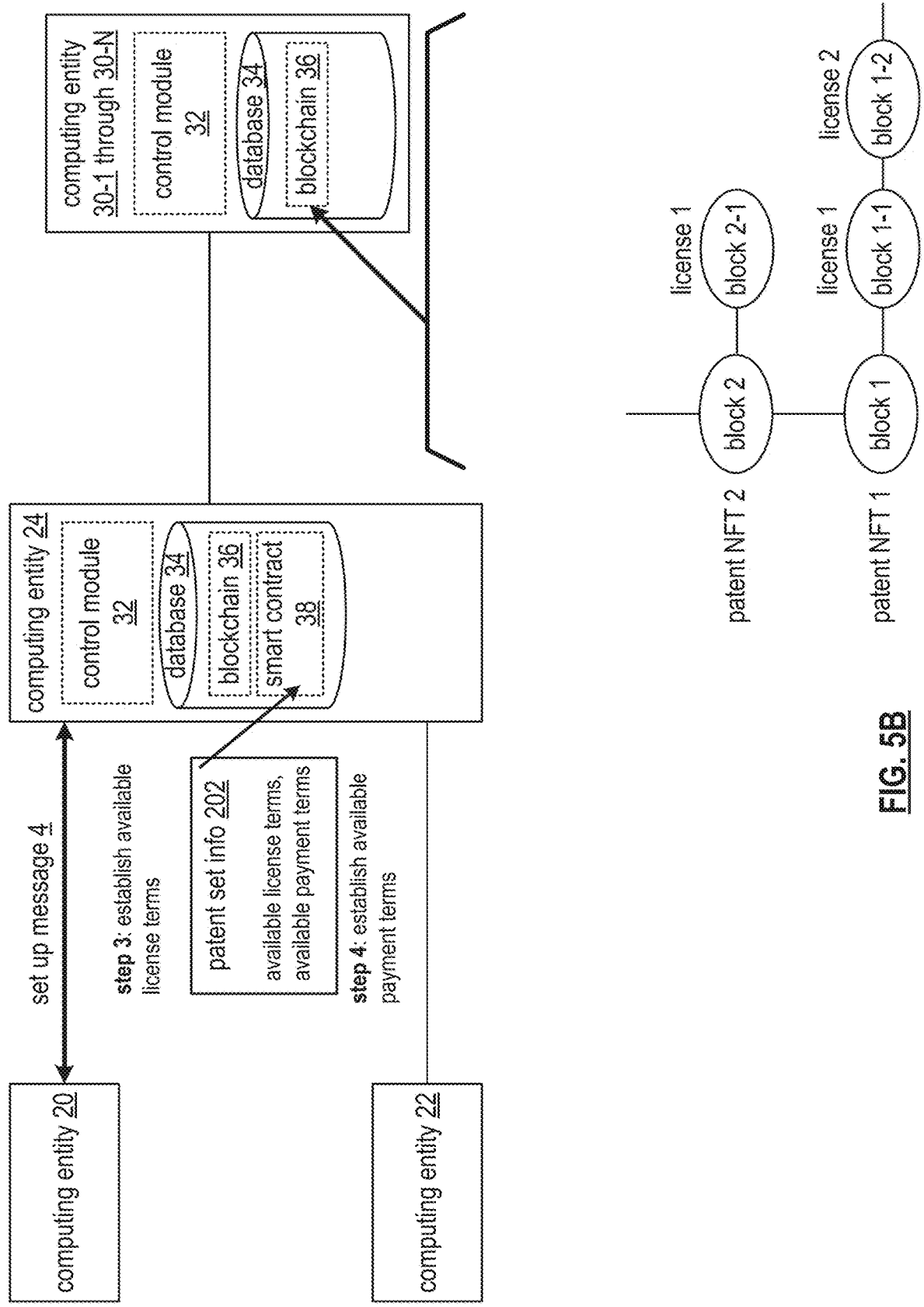
Figure 5C:
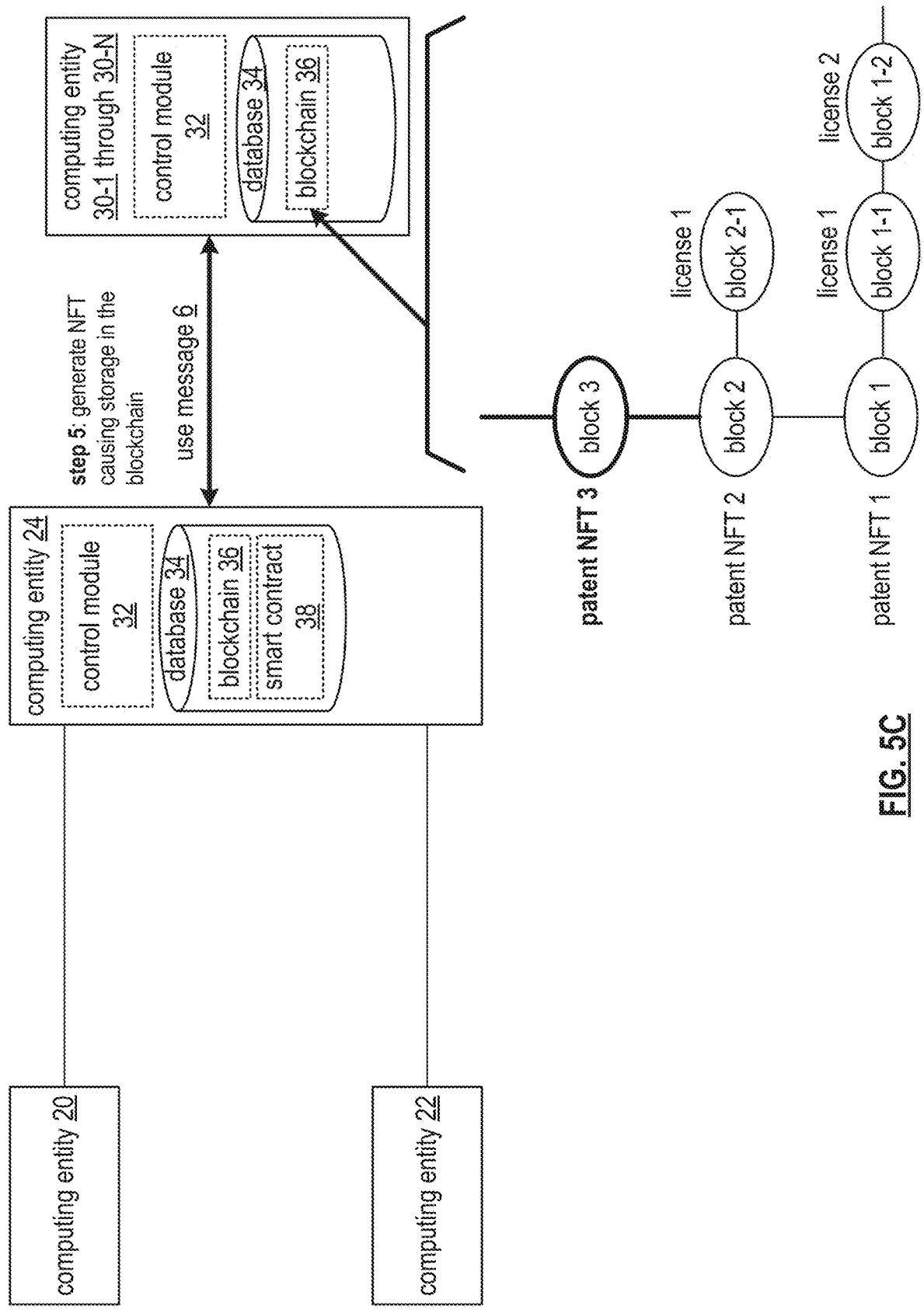

FIGS. 5A-5C are schematic block diagrams of an embodiment of a computing infrastructure illustrating an example of establishing a non-fungible token for a set of patents. The computing infrastructure includes the computing entity 20 of FIG. 1, the computing entity 22 of FIG. 1, the computing entity 24 of FIG. 1, and the computing entities 30-1 through 30-N of FIG. 1 serving as blockchain nodes for the patent distributed ledger. A portion of the patent distributed ledger is illustrated to include a plurality of patent nonfungible tokens (NFT) and associated license blocks.

FIG. 5A illustrates an example of operation of the method of establishing the non-fungible token for the set of patents. A first step of the example of operation includes the computing entity 24 interpreting a request (e.g., set up message 4) from a patent owner computing device of the computing infrastructure to make available for licensing a set of patents to produce patent basics of a smart contract for the set of patents. In the example, the computing entity 20 includes the patent owner computing device and the computing entity 24 includes the broker computing device. The patent basics include a patent set identifier, a patent number of at least one patent number of the set of patents, and at least one patent owner identifier associated with the set of patents.

The interpreting the request to make available for licensing the set of patents to produce the patent basics of the smart contract includes one or more approaches of a variety of approaches. A first approach includes identifying a set of patent numbers for the set of patents. For example, the computing entity 24 identifies the set of patent numbers from the set up message 4 from the computing entity 20. A second approach includes generating the patent set identifier based on the set of patent numbers. For example, the computing entity 24 hashes the set of patent numbers to produce the patent set identifier. As another example, the computing entity 24 lists each patent number of the set of patent numbers in an aggregation to produce the patent set identifier.

A third approach includes identifying a set of patent owner identifiers associated with the set of patents. For example, the computing entity 24 interprets assignee information of the set up message 4 to produce the set of patent owner identifiers. As another example, the computing entity 24 interprets applicant information of the setup message 4 to produce the set of patent owner identifiers. As yet another example, the computing entity 24 extracts the set of patent owner identifiers directly from the set up message 4.

A fourth approach includes determining a set of application areas for the set of patents. Each application area describes how technology associated with a corresponding patent is applied in practice. For example, the computing entity 24 extracts the set of application areas directly from the set up message 4. As another example, the computing entity 24 interprets a set of abstracts associated with the set of patents to identify the application areas for the set of patents. As yet another example, the computing entity 24 interprets a set of claims associated with the set of patents to identify the application areas for the set of patents.

A fifth approach includes identifying, for each patent of the set of patents, a corresponding patent issuance office. For example, the computing entity 24 interprets the set of patents to identify the corresponding patent issuance office. For instance, the computing entity 24 identifies the US patent and trademark office as the corresponding patent issuance office when a particular patent is a US patent.

A sixth approach includes identifying, for each patent of the set of patents, an expiration date of the patent. For example, the computing entity 24 interprets the set of patents to identify expiration date of each patent of the set of patents.

Having produce the patent basics for the smart contract, a second step of the example method of operation of establishing the non-fungible token for the set of patents includes the computing entity 24 verifying with a patent issuance computing device of the computing infrastructure, validity of the patent basics. In the example, the computing entity 22 includes the patent issuance computing device. The verifying the validity of the patent basics includes a series of sub-steps. A first sub-step includes identifying the patent issuance computing device based on a first identified corresponding patent issuance office of the patent basics for a first patent of the set of patents. For example, the computing entity 24 identifies an IP address, or other access means, associated with a portal of the US patent office when the patent issuance office is the US patent and trademark office.

A second sub-step includes obtaining patent issuance information from the patent issuance computing device for the first patent of the set of patents. For example, the computing entity 24 extracts the first patent from a set up message 4 from the computing entity 22. A third sub-step includes indicating that the patent basics is valid for the first patent when the patent issuance information is substantially the same as the patent basics for the first patent. For example, the computing entity 24 compares each aspect of the patent basics to retrieved patents from the computing entity 22 and indicates that the patent basics is valid when the comparison indicates that the patent basics matches the retrieved patents (e.g., same title, patent number, expiration date, claims, applicant, assignee, abstract, etc.).

FIG. 5B further illustrates the example of operation, where having verified the patent basics of the smart contract, when the patent basics are valid, a third step of the example method of operation of the establishing the non-fungible token for the set of patents includes the computing entity 24 establishing available license terms of the smart contract for the set of patents. The establishing the available license terms of the smart contract for the set of patents includes a series of sub-steps. A first sub-step includes establishing baseline available license terms from a terms template. For example, the computing entity 24 recovers the terms template from the database 34 of the computing entity 24. As another example, the computing entity 24 interprets a set up message number 4 from the computing entity 20 that includes the terms template (e.g., from a patent owner).

A second sub-step includes modifying the baseline available license terms based on the patent basics to produce proposed available license terms. For example, the computing entity 24 changes one or more items of the baseline available license terms based on facts of the patent basics to produce the proposed available license terms. For instance, a license timeframe is filled in based on a patent expiration date.

A third sub-step includes determining whether the proposed available license terms are acceptable to a set of owners associated with the set of patents. For example, the computing entity 24 compares the proposed available license terms to a maximum acceptable set of license terms recovered from the database 34 of the computing entity 24. As another example, the computing entity 24 interprets a set up message 4 from the computing entity 20 in response to presenting the proposed available license terms to the set of owners (e.g., in an authorization request sent to the computing entity 20).

A fourth sub-step includes establishing the proposed available license terms as the available license terms for the smart contract when the proposed available license terms are acceptable to the set of owners. For example, the computing entity 24 indicates that the proposed available license terms are the available license terms when determining that the proposed available license terms are acceptable to the set of owners.

Having established the available license terms for the smart contract, a fourth step of the example method of operation of the establishing the non-fungible token for the set of patents includes the computing entity 24 establishing available payment terms of the smart contract for the set of patents. The establishing the available payment terms of the smart contract for the set of patents includes a series of sub-steps. A first sub-step includes establishing baseline available payment terms from the terms template. For example, the computing entity 24 recovers the terms template from the database 34 of the computing entity 24 and extracts the available payment terms from the terms template. As another example, the computing entity 24 interprets a set up message number 4 from the computing entity 20 that includes the baseline available payment terms (e.g., from one or more patent owners).

A second sub-step includes modifying the baseline available payment terms based on the patent basics to produce proposed available payment terms. For example, the computing entity 24 changes one or more items of the baseline available payment terms based on facts of the patent basics to produce the proposed available payment terms. For instance, a payment timeframe is filled in based on a particular patent expiration date.

A third sub-step includes determining whether the proposed available payment terms are acceptable to a set of owners associated with the set of patents. For example, the computing entity 24 compares the proposed available payment terms to a minimum acceptable set of payment terms recovered from the database 34 of the computing entity 24. As another example, the computing entity 24 interprets a set up message 4 from the computing entity 20 in response to presenting the proposed available payment terms to the set of owners (e.g., in a payment approval request sent to the computing entity 20).

A fourth sub-step includes establishing the proposed available payment terms as the available payment terms for the smart contract when the proposed available payment terms are acceptable to the set of owners. For example, the computing entity 24 indicates that the proposed available payment terms are the available payment terms when determining that the proposed available payment terms are acceptable to the set of owners (e.g., by prestored minimum requirements, by instant approval).

FIG. 5C further illustrates the example method of operation, where having produced the smart contract, a fifth step of the example method of operation of the establishing of the nonfungible token for the set of patents includes the computing entity 24 causing generation of the non-fungible token associated with the smart contract in the patent distributed ledger. The causing the generation of the non-fungible token associated with the smart contract in the patent distributed ledger includes determining whether to indirectly or directly update the patent distributed ledger. For example, the computing entity 24 determines to indirectly update the patent distributed ledger when the computing entity 24 does not have a satisfactory direct access to the patent distributed ledger. As another example, the computing entity 24 determines to directly update the patent distributed ledger when a predetermination stored in the database 34 indicates to directly access the patent distributed ledger when possible.

When indirectly updating the patent distributed ledger, the causing the generation includes the computing entity 24 issuing a non-fungible token generation request to a patent ledger computing device serving as a blockchain node of the patent distributed ledger. The non-fungible token generation request includes the smart contract. For example, the computing entity 24 issues a use message 6 to the computing entity 30-1, where the use message 6 includes the request. In response, the computing entity 30-1 adds a new non-fungible token listing to the patent distributed ledger (e.g., as illustrated by patent NFT 3 in the example of FIG. 5C).

When directly updating the patent distributed ledger, the causing the generation includes the computing entity 24 performing a series of sub-steps. A first sub-step includes obtaining a copy of the patent distributed ledger. For example, the computing entity 24 extracts the patent distributed ledger from a use message 6 from the computing entity 30-1. As another example, the computing entity 24 recovers the patent distributed ledger from the blockchain 36 of the database 34 of the computing entity 24.

A second sub-step includes hashing the smart contract utilizing a receiving public key of the patent distributed ledger to produce a next transaction hash value. For example, the computing entity 24 obtains a suitable receiving public key (e.g., from a current version of the blockchain, from a blockchain node, from a computing entity 20) and performs the hashing function to produce the next transaction hash value.

A third sub-step includes encrypting the next transaction hash value utilizing a private key of the broker computing device to produce a next transaction signature. For example, the computing entity 24 recovers a private key associated with the computing entity 24 and utilizes the recovered private key to encrypt the next transaction hash value to produce the next transaction signature.

A fourth sub-step includes generating a next block of a blockchain of the patent distributed ledger to include the smart contract and the next transaction signature. For example, the computing entity 24 generates the next block as previously discussed with regards to FIG. 1D to include the smart contract and the next transaction signature.

A fifth sub-step includes causing inclusion of the next block as the non-fungible token in the patent distributed ledger. For example, the computing entity 24 appends the next block of the blockchain in the patent distributed ledger as previously discussed with reference to FIG. 1D to update the patent distributed ledger as illustrated in FIG. 5C, where the non-fungible token patent NFT 3 is represented by the next block 3.

The method described above in conjunction with a processing module of any computing entity of the computing infrastructure of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of FIG. 1 to perform any or all of the method steps described above.

FIGS. 6A-6C are schematic block diagrams of an embodiment of a computing infrastructure illustrating an example of establishing a license for a set of patents utilizing a non-fungible token. The computing infrastructure includes the computing entity 20 of FIG. 1, the computing entity 22 of FIG. 1, the computing entity 24 of FIG. 1, the computing entities 26-1 through 26-N of FIG. 1, and the computing entities 30-1 through 30-N of FIG. 1 serving as blockchain nodes for the patent distributed ledger. A portion of the patent distributed ledger is illustrated to include a plurality of patent nonfungible tokens (NFT) and associated license blocks.

FIG. 6A illustrates an example of operation of the method of establishing the license for the set of patents utilizing the non-fungible token. A first step of the example of operation includes the computing entity 24 interpreting a request from a user computing device of the computing infrastructure to license a set of patents to produce licensee information of a smart contract for the set of patents. The licensee information includes a licensee identifier and an identifier of the set of patents. For example, the computing entity 24 receives a use message 6 from the computing entity 26-1, where the use message 6 includes the request to license the set of patents. Having received the use message 6, the computing entity 24 interprets the use message 6 to extract the licensee information (e.g., the licensee identifier, the identifier of the set of patents, desired licensing terms).

The receiving of the use message 6 by the computing entity 24 includes the computing entity 26-1 issuing the use message 6. The issuing of the use message 6 includes determining to generate and send the use message 6. The determining to generate and send includes identifying a need to license the set of patents. The identifying the need to license the set of patents includes at least one of accessing another computing entity that indicates the need to license, executing software within the computing entity 26-1 that indicates the need to license, and determining that the computing entity 26-1 may need to perform a function related to a technology application area associated with the set of patents.

Having interpreted the request to license the set of patents, the example method of operation to establish the license for the set of patents utilizing the non-fungible token includes a second step where the computing entity 24 determines whether a non-fungible token associated with the set of patents is available (e.g., already exists in the patent distributed ledger). The non-fungible token includes a smart contract for the set of patents. The smart contract includes one or more of patent basics of the set of patents, available license terms, and available payment terms.

The determining whether the non-fungible token is available includes a variety of approaches. A first approach includes the computing entity 24 obtaining the blockchain of the patent distributed ledger and attempting to identify the non-fungible token. For example, the computing entity 24 recovers the patent distributed ledger from the blockchain 36 of the database 34 of the computing entity 24 when the patent distribute and ledger is stored by the computing entity 24. As another example, the computing entity 24 interprets a use message 6 from the computing entity 30-1 which serves as a blockchain node storing a copy of the patent distribute and ledger. The computing entity 24 indicates that the nonfungible token is available when identifying a nonfungible token of the patent distributed ledger that compares favorably to the set of patents. For instance, the computing entity 24 identifies patent non-fungible token (NFT) 3 of the blockchain as illustrated in FIG. 6A when NFT 3 matches the set of patents.

FIG. 6B further illustrates the example method of operation to establish the license for the set of patents, where having determined whether the nonfungible token is available, when the non-fungible token for the set of patents is available, a third step includes the computing entity 24 establishing agreed license terms based on the available license terms of the set of patents to update the smart contract to produce a new smart contract.

The establishing the agreed license terms for the new smart contract for the set of patents includes a series of sub-steps. A first sub-step includes obtaining the available license terms from one or more of the smart contract of the nonfungible token and a terms template recovered from the database 34. For example, the computing entity 24 recovers the terms template from the database 34 of the computing entity 24. As another example, the computing entity 24 extracts the available license terms from the smart contract 38.

A second sub-step includes modifying the available license terms based on the request to license the set of patents to produce proposed agreed license terms. For example, the computing entity 24 fills in one or more items of the available license terms based on facts of the request to license to produce the proposed agreed license terms. For instance, a license geography is filled in based on a geographic area of the request to license that is compatible with available licensing geography.

A third sub-step includes determining whether the proposed agreed license terms are acceptable to a set of owners associated with the set of patents. For example, the computing entity 24 compares the proposed agreed license terms to a maximum acceptable set of license terms recovered from the database 34 of the computing entity 24. As another example, the computing entity 24 interprets a set up message 4 from the computing entity 20 in response to presenting the proposed agreed license terms to the set of owners (e.g., in a deal approval request sent to the computing entity 20).

A fourth sub-step includes establishing the proposed agreed license terms as the agreed license terms for the new smart contract when the proposed agreed license terms are acceptable to the set of owners. For example, the computing entity 24 indicates that the proposed agreed license terms are the agreed license terms when determining that the proposed agreed license terms are acceptable to the set of owners.

Having established the agreed license terms for the new smart contract, a fourth step of the example method of operation of the licensing of the set of patents includes the computing entity 24 establishing agreed payment terms of the new smart contract for the set of patents. The establishing the agreed payment terms of the new smart contract for the set of patents includes a series of sub-steps. A first sub-step includes obtaining baseline agreed payment terms from at least one of the smart contract and the terms template. For example, the computing entity 24 recovers the terms template from the database 34 of the computing entity 24 and extracts the baseline agreed payment terms from the terms template. As another example, the computing entity 24 interprets a set up message number 4 from the computing entity 20 that includes the baseline agreed payment terms (e.g., from one or more patent owners). As yet another example, the computing entity 24 extracts the available payment terms directly from the smart contract recovered from the patent distributed ledger to produce the baseline agreed payment terms.

A second sub-step includes modifying the baseline agreed payment terms based on the request to license to produce proposed agreed payment terms. For example, the computing entity 24 changes one or more items of the baseline agreed payment terms based on facts of the request to license to produce the proposed agreed payment terms. For instance, a fully paid license (e.g., up front payment) is selected based on a desire expressed in the request to license.

A third sub-step includes determining whether the proposed agreed payment terms are acceptable to a set of owners associated with the set of patents. For example, the computing entity 24 compares the proposed agreed payment terms to a minimum acceptable set of payment terms recovered from the database 34 of the computing entity 24. As another example, the computing entity 24 interprets a set up message 4 from the computing entity 20 in response to presenting the proposed agreed payment terms to the set of owners (e.g., in a payment approval request sent to the computing entity 20).

A fourth sub-step includes establishing the proposed agreed payment terms as the agreed payment terms for the new smart contract when the proposed agreed payment terms are acceptable to the set of owners. For example, the computing entity 24 indicates that the proposed agreed payment terms are the agreed payment terms when determining that the proposed agreed payment terms are acceptable to the set of owners (e.g., by prestored minimum requirements, by instant approval).

FIG. 6C further illustrates the example of operation, where having produced the smart contract, a fifth step of the example method of operation of the licensing of the set of patents includes the computing entity 24 generating a new block with the new smart contract for a blockchain of the patent distributed ledger associated with the non-fungible token. The generating the new block includes determining whether to indirectly or directly update the patent distributed ledger. For example, the computing entity 24 determines to indirectly update the patent distributed ledger when the computing entity 24 does not have a satisfactory direct access to the patent distributed ledger. As another example, the computing entity 24 determines to directly update the patent distributed ledger when a predetermination stored in the database 34 indicates to directly access the patent distributed ledger when possible.

When indirectly updating the patent distributed ledger, the generating of the block includes the computing entity 24 issuing a block generation request to a patent ledger computing device serving as a blockchain node of the patent distributed ledger. The block generation request includes the new smart contract. For example, the computing entity 24 issues a use message 6 to the computing entity 30-1, where the use message 6 includes the request in the new smart contract. In response, the computing entity 30-1 adds a new block to the patent distributed ledger (e.g., as illustrated by license 1 within block 3-1 of patent NFT 3 in the example of FIG. 6C).

When directly updating the patent distributed ledger, the causing the generation of the block includes the computing entity 24 performing a series of sub-steps. A first sub-step includes obtaining a copy of the patent distributed ledger. For example, the computing entity 24 extracts the patent distributed ledger from a use message 6 from the computing entity 30-1. As another example, the computing entity 24 recovers the patent distributed ledger from the blockchain 36 of the database 34 of the computing entity 24.

A second sub-step includes hashing the new smart contract utilizing a receiving public key of the patent distributed ledger to produce a next transaction hash value. For example, the computing entity 24 obtains a suitable receiving public key (e.g., from a current version of the blockchain, from a blockchain node, from a computing entity 20) and performs the hashing function to produce the next transaction hash value.

A third sub-step includes encrypting the next transaction hash value utilizing a private key of the broker computing device to produce a next transaction signature. For example, the computing entity 24 recovers a private key associated with the computing entity 24 and utilizes the recovered private key to encrypt the next transaction hash value to produce the next transaction signature.

A fourth sub-step includes generating a next block (e.g., block 3-1) of a blockchain of the patent distributed ledger to include the new smart contract and the next transaction signature. For example, the computing entity 24 generates the next block as previously discussed with regards to FIG. 1D to include the new smart contract and the next transaction signature.

A fifth sub-step includes causing inclusion of the next block in the patent distributed ledger. For example, the computing entity 24 appends the next block of the blockchain in the patent distributed ledger as previously discussed with reference to FIG. 1D to update the patent distributed ledger as illustrated in FIG. 6C by the license 1 of block 3-1 of NFT 3.

The method described above in conjunction with a processing module of any computing entity of the computing infrastructure of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of FIG. 1 to perform any or all of the method steps described above.

FIGS. 7A-7C are schematic block diagrams of an embodiment of a computing infrastructure illustrating another example of establishing a license for a set of patents. The computing infrastructure includes the computing entity 20 of FIG. 1, the computing entity 22 of FIG. 1, the computing entity 24 of FIG. 1, the computing entities 26-1 through 26-N of FIG. 1, the computing entities 28-1 through 28-N of FIG. 1, and the computing entities 30-1 through 30-N of FIG. 1 serving as blockchain nodes for the patent distributed ledger. A portion of the patent distributed ledger is illustrated to include a plurality of patent nonfungible tokens (NFT) and associated license blocks. In the example, the computing entities 28-1 through 28-N serve as reporting computing devices.

FIG. 7A illustrates an example of operation of the method of establishing the license for the set of patents utilizing. A first step of the example method of operation includes the reporting computing device identifying potential use of a set of patents by a user computing device of the computing infrastructure. The identifying includes one or more of interpreting a direct request by the user computing device to utilize technology of the set of patents, interpreting operations of the user computing device to identify utilization of the technology of the set of patents, and anticipating future operations of the user computing device to identify the utilization of the technology of the set appends. For example, the computing entity 28-1 interprets a transaction message 8 from the computing entity 26-1 to indicate the potential use of the set of patents by the computing entity 26-1 when the transaction message 8 is associated with utilization of the technology of the set of patents.

A second step of the example of operation includes the computing entity 24 interpreting a request from the reporting computing device to cause a license of the set of patents for use by the user computer device to produce licensee information of a smart contract for the set of patents. The licensee information includes a license identifier and an identifier of the set of patents. For example, the computing entity 24 receives a use message 6 from the computing entity 28-1 (e.g., the reporting computing device), where the use message 6 includes a request to license the set of patents to the computing entity 26-1. Having received the use message 6, the computing entity 24 interprets the use message 6 to extract the licensee information (e.g., the licensee identifier, the identifier of the set of patents, desired licensing terms, etc.).

The receiving of the use message 6 by the computing entity 24 includes the computing entity 28-1 issuing the use message 6. The issuing of the use message 6 includes determining to generate and send the use message 6 when identifying the potential use of the set of patents.

Having interpreted the request to license the set of patents, the example method of operation to establish the license for the set of patents includes a third step where the computing entity 24 determines whether a non-fungible token associated with the second patents is licensed by the user computing device. The non-fungible token includes a smart contract for the set of patents. The smart contract includes one or more of patent basics of the set of patents, available license terms, available payment terms, agreed license terms, and agreed payment terms.

The determining whether the non-fungible token is license by the computing entity 26-1 includes a variety of approaches. A first approach includes the computing entity 24 obtaining the blockchain of the patent distributed ledger and attempting to identify the license block for the NFT. For example, the computing entity 24 recovers the patent distributed ledger from the blockchain 36 of the database 34 of the computing entity 24 when the patent distributed ledger is stored by the computing entity 24. As another example, the computing entity 24 interprets a use message 6 from the computing entity 30-1 which serves as a blockchain node storing a copy of the patent distributed ledger. The computing entity 24 indicates that the user computing device has the license when identifying a non-fungible token of the patent distributed ledger that compares favorably to the set of patents and when a license block for the user computing device is associated with the NFT.

The computing entity 24 indicates that the user computing device does not have the license when either the NFT the set of patents doesn't exist or when the NFT does exist the license block for the user computing device does not exist or is defective. For instance, the computing entity 24 identifies patent non-fungible token (NFT) 2 of the blockchain as illustrated in FIG. 7A when NFT 2 matches the set of patents, but indicates that the user computing device does not have a license when the only license 1 of block 2-1 for the NFT 2 is not associated with the computing entity 26-1 (e.g., the user computing device requiring the license to the set of patents).

FIG. 7B further illustrates the example method of operation to establish the license for the set of patents, where having determined whether the non-fungible token has been licensed by the user computing device, when the non-fungible token for the set of patents is available but not licensed by the user computing device, a fourth step includes the computing entity 24 establishing agreed license terms based on the available license terms of the set of patents to update the smart contract to produce a new smart contract.

The establishing the agreed license terms for the new smart contract for the set of patents includes a series of sub-steps. A first sub-step includes obtaining the available license terms from one or more of the smart contract of the non-fungible token and a terms template recovered from the database 34. For example, the computing entity 24 recovers the terms template from the database 34 of the computing entity 24. As another example, the computing entity 24 extracts the available license terms from the smart contract 38.

A second sub-step includes modifying the available license terms based on the request to license the set of patents to produce proposed agreed license terms. For example, the computing entity 24 fills in one or more items of the available license terms based on facts of the request to license to produce the proposed agreed license terms. For instance, a license geography is filled in based on a geographic area of the request to license that is compatible with available licensing geography.

A third sub-step includes determining whether the proposed agreed license terms are acceptable to a set of owners associated with the set of patents. For example, the computing entity 24 compares the proposed agreed license terms to a maximum acceptable set of license terms recovered from the database 34 of the computing entity 24. As another example, the computing entity 24 interprets a set up message 4 from the computing entity 20 in response to presenting the proposed agreed license terms to the set of owners (e.g., in a deal approval request sent to the computing entity 20).

A fourth sub-step includes establishing the proposed agreed license terms as the agreed license terms for the new smart contract when the proposed agreed license terms are acceptable to the set of owners. For example, the computing entity 24 indicates that the proposed agreed license terms are the agreed license terms when determining that the proposed agreed license terms are acceptable to the set of owners.

Having established the agreed license terms for the new smart contract, a fifth step of the example method of operation of the licensing of the set of patents includes the computing entity 24 establishing agreed payment terms of the new smart contract for the set of patents. The establishing the agreed payment terms of the new smart contract for the set of patents includes a series of sub-steps. A first sub-step includes obtaining baseline agreed payment terms from at least one of the smart contract and the terms template. For example, the computing entity 24 recovers the terms template from the database 34 of the computing entity 24 and extracts the baseline agreed payment terms from the terms template. As another example, the computing entity 24 interprets a set up message number 4 from the computing entity 20 that includes the baseline agreed payment terms (e.g., from one or more patent owners). As yet another example, the computing entity 24 extracts the available payment terms directly from the smart contract recovered from the patent distributed ledger to produce the baseline agreed payment terms.

A second sub-step includes modifying the baseline agreed payment terms based on the request to license to produce proposed agreed payment terms. For example, the computing entity 24 changes one or more items of the baseline agreed payment terms based on facts of the request to license to produce the proposed agreed payment terms. For instance, a pay-as-you-go license (e.g., percentage of sales revenue) is selected based on a desire expressed in the request to license.

A third sub-step includes determining whether the proposed agreed payment terms are acceptable to a set of owners associated with the set of patents. For example, the computing entity 24 compares the proposed agreed payment terms to a minimum acceptable set of payment terms recovered from the database 34 of the computing entity 24. As another example, the computing entity 24 interprets a set up message 4 from the computing entity 20 in response to presenting the proposed agreed payment terms to the set of owners (e.g., in a payment approval request sent to the computing entity 20).

A fourth sub-step includes establishing the proposed agreed payment terms as the agreed payment terms for the new smart contract when the proposed agreed payment terms are acceptable to the set of owners. For example, the computing entity 24 indicates that the proposed agreed payment terms are the agreed payment terms when determining that the proposed agreed payment terms are acceptable to the set of owners (e.g., by prestored minimum requirements, by instant approval).

FIG. 7C further illustrates the example of operation, where having produced the smart contract, a sixth step of the example method of operation of the licensing of the set of patents includes the computing entity 24 generating a new block with the new smart contract for a blockchain of the patent distributed ledger associated with the non-fungible token. The generating the new block includes determining whether to indirectly or directly update the patent distributed ledger. For example, the computing entity 24 determines to indirectly update the patent distributed ledger when the computing entity 24 does not have a satisfactory direct access to the patent distributed ledger. As another example, the computing entity 24 determines to directly update the patent distributed ledger when a predetermination stored in the database 34 indicates to directly access the patent distributed ledger when possible.

When indirectly updating the patent distributed ledger, the generating of the block includes the computing entity 24 issuing a block generation request to a patent ledger computing device serving as a blockchain node of the patent distributed ledger. The block generation request includes the new smart contract. For example, the computing entity 24 issues a use message 6 to the computing entity 30-1, where the use message 6 includes the request in the new smart contract. In response, the computing entity 30-1 adds a new block to the patent distributed ledger (e.g., as illustrated by license 2 within block 2-2 of patent NFT 2 in the example of FIG. 7C).

When directly updating the patent distributed ledger, the causing the generation of the block includes the computing entity 24 performing a series of sub-steps. A first sub-step includes obtaining a copy of the patent distributed ledger. For example, the computing entity 24 extracts the patent distributed ledger from a use message 6 from the computing entity 30-1. As another example, the computing entity 24 recovers the patent distributed ledger from the blockchain 36 of the database 34 of the computing entity 24.

A second sub-step includes hashing the new smart contract utilizing a receiving public key of the patent distributed ledger to produce a next transaction hash value. For example, the computing entity 24 obtains a suitable receiving public key (e.g., from a current version of the blockchain, from a blockchain node, from a computing entity 20) and performs the hashing function to produce the next transaction hash value.

A third sub-step includes encrypting the next transaction hash value utilizing a private key of the broker computing device to produce a next transaction signature. For example, the computing entity 24 recovers a private key associated with the computing entity 24 and utilizes the recovered private key to encrypt the next transaction hash value to produce the next transaction signature.

A fourth sub-step includes generating a next block (e.g., block 2-2) of a blockchain of the patent distributed ledger to include the new smart contract and the next transaction signature. For example, the computing entity 24 generates the next block as previously discussed with regards to FIG. 1D to include the new smart contract and the next transaction signature.

A fifth sub-step includes causing inclusion of the next block in the patent distributed ledger. For example, the computing entity 24 appends the next block of the blockchain in the patent distributed ledger as previously discussed with reference to FIG. 1D to update the patent distributed ledger as illustrated in FIG. 7C by the license 2 of block 2-2 of NFT 2.

The method described above in conjunction with a processing module of any computing entity of the computing infrastructure of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of FIG. 1 to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computer-implemented method of using a computing infrastructure for utilizing a patent distributed ledger, the method comprises:

interpreting, by a broker computing device of the computing infrastructure, at least one of operations and anticipated future operations of a user computing device of the computing infrastructure to identify utilization of technology of a set of patents by the user computing device;

generating, by the broker computing device, an indication of utilization of technology of the set of patents by the user computing device;

accessing, by the broker computing device, a patent distributed ledger potentially associated with the set of patents;

determining, by the broker computing device, that the user computing device is not affiliated with licensing of the set of patents and that the patent distributed ledger is not associated with the set of patents based on content of the patent distributed ledger;

generating, by the broker computing device, a licensing request including the indication of utilization of technology of the set of patents by the user computing device, wherein the licensing request includes a request to make available for licensing the set of patents;

issuing, by the broker computing device, the licensing request to a patent owner computing device of the computing infrastructure;

interpreting, by the broker computing device, a request from the patent owner computing device to make available for licensing the set of patents to produce patent basics of a smart contract for the set of patents, wherein the patent basics includes a patent set identifier, a patent number of at least one patent number of the set of patents, and at least one patent owner identifier associated with the set of patents, wherein the interpreting the request further includes:

hashing, by the broker computing device, a set of patent numbers of the set of patents to produce the patent set identifier, and interpreting, by the broker computing device, a set of claims associated with the set of patents to describe how technology associated with a corresponding patent is applied in practice for inclusion in the smart contract;

verifying, by the broker computing device, with a patent issuance computing device of the computing infrastructure, validity of the patent basics; and when the patent basics are valid:

establishing, by the broker computing device, available license terms of the smart contract for the set of patents, establishing, by the broker computing device, available payment terms of the smart contract for the set of patents, generating, by the broker computing device, a nonce for the smart contract such that subsequent application of a hashing function to a combination of the nonce and the smart contract produces a resulting hash with a distinct number of preceding zeroes which is subsequently utilized by another computing device to validate the smart contract only when the other computing device confirms the distinct number of preceding zeroes, obtaining, by the broker computing device, a copy of the patent distributed ledger, hashing, by the broker computing device, the smart contract utilizing a receiving public key of the patent distributed ledger to produce a next transaction hash value, wherein the next transaction hash value includes the resulting hash with the distinct number of preceding zeroes, encrypting, by the broker computing device, the next transaction hash value utilizing a private key of the broker computing device to produce a next transaction signature, generating, by the broker computing device, a new block of a blockchain of the patent distributed ledger to include the smart contract and the next transaction signature, and causing, by the broker computing device, inclusion of the new block in the patent distributed ledger.

2. The method of claim 1, wherein the interpreting the request to make available for licensing the set of patents to produce the patent basics of the smart contract comprises one or more of:
  identifying the set of patent numbers for the set of patents;
  generating the patent set identifier based on the set of patent numbers;
  identifying a set of patent owner identifiers associated with the set of patents;
  identifying, for each patent of the set of patents, a corresponding patent issuance office; and
  identifying, for each patent of the set of patents, an expiration date of the patent.

3. The method of claim 1, wherein the verifying the validity of the patent basics comprises:
  identifying the patent issuance computing device based on a first identified corresponding patent issuance office of the patent basics for a first patent of the set of patents;
  obtaining patent issuance information from the patent issuance computing device for the first patent of the set of patents; and
  indicating that the patent basics is valid for the first patent when the patent issuance information is the same as the patent basics for the first patent.

4. The method of claim 1, wherein the establishing the available license terms of the smart contract for the set of patents comprises:
  establishing baseline available license terms from a terms template;
  modifying the baseline available license terms based on the patent basics to produce proposed available license terms;
  determining whether the proposed available license terms are acceptable to a set of owners associated with the set of patents; and
  establishing the proposed available license terms as the available license terms for the smart contract when the proposed available license terms are acceptable to the set of owners.

5. The method of claim 1, wherein the establishing the available payment terms of the smart contract for the set of patents comprises:
  establishing baseline available payment terms from a terms template;
  modifying the baseline available payment terms based on the patent basics to produce proposed available payment terms;
  determining whether the proposed available payment terms are acceptable to a set of owners associated with the set of patents; and
  establishing the proposed available payment terms as the available payment terms for the smart contract when the proposed available payment terms are acceptable to the set of owners.

6. A computing device of a computing infrastructure, the computing device comprises:
  an interface;
  a local memory; and
  a processor operably coupled to the interface and the local memory, wherein the processor executes operational instructions stored in the local memory to:
    interpret at least one of operations and anticipated future operations of a user computing device of the computing infrastructure to identify utilization of technology of a set of patents by the user computing device;
  generate an indication of utilization of technology of the set of patents by the user computing device;
  access, via the interface, a patent distributed ledger potentially associated with the set of patents;
  determine that the user computing device is not affiliated with licensing of the set of patents and that the patent distributed ledger is not associated with the set of patents based on content of the patent distributed ledger;
  generate a licensing request including the indication of utilization of technology of the set of patents by the user computing device, wherein the licensing request includes a request to make available for licensing the set of patents;
  issue, via the interface, the licensing request to a patent owner computing device of the computing infrastructure;
  interpret a request from the patent owner computing device-to make available for licensing the set of patents to produce patent basics of a smart contract for the set of patents, wherein the patent basics includes a patent set identifier, a patent number of at least one patent number of the set of patents, and at least one patent owner identifier associated with the set of patents, wherein the processor further interprets the request by:
    hashing a set of patent numbers of the set of patents to produce the patent set identifier, and
    interpreting a set of claims associated with the set of patents to describe how technology associated with a corresponding patent is applied in practice for inclusion in the smart contract;
  verify with a patent issuance computing device of the computing infrastructure, validity of the patent basics; and
  when the patent basics are valid:
    establish available license terms of the smart contract for the set of patents,
    establish available payment terms of the smart contract for the set of patents,
    generate a nonce for the smart contract such that subsequent application of a hashing function to a combination of the nonce and the smart contract produces a resulting hash with a distinct number of preceding zeroes which is subsequently utilized by another computing device to validate the smart contract only when the other computing device confirms the distinct number of preceding zeroes, obtain a copy of the patent distributed ledger,
    hash the smart contract utilizing a receiving public key of the patent distributed ledger to produce a next transaction hash value, wherein the next transaction hash value includes the resulting hash with the distinct number of preceding zeroes, encrypt the next transaction hash value utilizing a private key of the computing device to produce a next transaction signature,
generate a new block of a blockchain of the patent distributed ledger to include the smart contract and the next transaction signature, and
cause inclusion of the new block in the patent distributed ledger.

7. The computing device of claim 6, wherein the processor executes the operational instructions stored in the local memory to interpret the request to make available for licensing the set of patents to produce the patent basics of the smart contract by one or more of:
identifying the set of patent numbers for the set of patents;
generating the patent set identifier based on the set of patent numbers;
identifying a set of patent owner identifiers associated with the set of patents;
identifying, for each patent of the set of patents, a corresponding patent issuance office; and
identifying, for each patent of the set of patents, an expiration date of the patent.

8. The computing device of claim 6, wherein the processor executes the operational instructions stored in the local memory to verify the validity of the patent basics by:
identifying the patent issuance computing device based on a first identified corresponding patent issuance office of the patent basics for a first patent of the set of patents;
obtaining, via the interface, patent issuance information from the patent issuance computing device for the first patent of the set of patents; and
indicating that the patent basics is valid for the first patent when the patent issuance information is the same as the patent basics for the first patent.

9. The computing device of claim 6, wherein the processor executes the operational instructions stored in the local memory to establish the available license terms of the smart contract for the set of patents by:
establishing baseline available license terms from a terms template;
modifying the baseline available license terms based on the patent basics to produce proposed available license terms;
determining whether the proposed available license terms are acceptable to a set of owners associated with the set of patents; and
establishing the proposed available license terms as the available license terms for the smart contract when the proposed available license terms are acceptable to the set of owners.

10. The computing device of claim 6, wherein the processor executes the operational instructions stored in the local memory to establish the available payment terms of the smart contract for the set of patents by:
establishing baseline available payment terms from a terms template;
modifying the baseline available payment terms based on the patent basics to produce proposed available payment terms;
determining whether the proposed available payment terms are acceptable to a set of owners associated with the set of patents; and
establishing the proposed available payment terms as the available payment terms for the smart contract when the proposed available payment terms are acceptable to the set of owners.

11. A non-transitory computer readable memory that comprises:
a first memory element that stores operational instructions that, when executed by a processor, causes the processor to:
interpret at least one of operations and anticipated future operations of a user computing device of the computing infrastructure to identify utilization of technology of a set of patents by the user computing device;
generate an indication of utilization of technology of the set of patents by the user computing device;
access a patent distributed ledger potentially associated with the set of patents;
determine that the user computing device is not affiliated with licensing of the set of patents and that the patent distributed ledger is not associated with the set of patents based on content of the patent distributed ledger;
generate a licensing request including the indication of utilization of technology of the set of patents by the user computing device, wherein the licensing request includes a request to make available for licensing the set of patents;
issue the licensing request to a patent owner computing device of the computing infrastructure;
interpret a request from the patent owner computing device-to make available for licensing the set of patents to produce patent basics of a smart contract for the set of patents, wherein the patent basics includes a patent set identifier, a patent number of at least one patent number of the set of patents, and at least one patent owner identifier associated with the set of patents, wherein the processor further interprets the request by:
hashing a set of patent numbers of the set of patents to produce the patent set identifier, and
interpreting a set of claims associated with the set of patents to describe how technology associated with a corresponding patent is applied in practice for inclusion in the smart contract;
a second memory element that stores operational instructions that, when executed by the processor, causes the processor to:
verify with a patent issuance computing device of the computing infrastructure, validity of the patent basics; and
a third memory element that stores operational instructions that, when executed by the processor, causes the processor to:
when the patent basics are valid:
establish available license terms of the smart contract for the set of patents,
establish available payment terms of the smart contract for the set of patents, generate a nonce for the smart contract such that subsequent application of a hashing function to a combination of the nonce and the smart contract produces a resulting hash with a distinct number of preceding zeroes which is subsequently utilized by another computing device to validate the smart contract only when the other computing device confirms the distinct number of preceding zeroes, obtain a copy of the patent distributed ledger,
hash the smart contract utilizing a receiving public key of the patent distributed ledger to produce a next transaction hash value, wherein the next transaction hash value includes the resulting hash with the distinct number of preceding zeroes, encrypt the next transaction hash value utilizing a private key of the computing device to produce a next transaction signature, generate a new block of a blockchain of the patent distributed ledger to include the smart contract and the next transaction signature, and cause inclusion of the new block in the patent distributed ledger.

12. The non-transitory computer readable memory of claim 11, wherein the processor functions to execute the operational instructions stored by the first memory element to cause the processor to interpret the request to make available for licensing the set of patents to produce the patent basics of the smart contract by one or more of:

identifying the set of patent numbers for the set of patents;
generating the patent set identifier based on the set of patent numbers;
identifying a set of patent owner identifiers associated with the set of patents;
identifying, for each patent of the set of patents, a corresponding patent issuance office; and
identifying, for each patent of the set of patents, an expiration date of the patent.

13. The non-transitory computer readable memory of claim 11, wherein the processor functions to execute the operational instructions stored by the second memory element to cause the processor to verify the validity of the patent basics by:

identifying the patent issuance computing device based on a first identified corresponding patent issuance office of the patent basics for a first patent of the set of patents;
obtaining patent issuance information from the patent issuance computing device for the first patent of the set of patents; and
indicating that the patent basics is valid for the first patent when the patent issuance information is the same as the patent basics for the first patent.

14. The non-transitory computer readable memory of claim 11, wherein the processor functions to execute the operational instructions stored by the third memory element to cause the processor to establish the available license terms of the smart contract for the set of patents by:

establishing baseline available license terms from a terms template;
modifying the baseline available license terms based on the patent basics to produce proposed available license terms;
determining whether the proposed available license terms are acceptable to a set of owners associated with the set of patents; and
establishing the proposed available license terms as the available license terms for the smart contract when the proposed available license terms are acceptable to the set of owners.

15. The non-transitory computer readable memory of claim 11, wherein the processor functions to execute the operational instructions stored by the third memory element to cause the processor to establish the available payment terms of the smart contract for the set of patents by:

establishing baseline available payment terms from a terms template;
modifying the baseline available payment terms based on the patent basics to produce proposed available payment terms;
determining whether the proposed available payment terms are acceptable to a set of owners associated with the set of patents; and
establishing the proposed available payment terms as the available payment terms for the smart contract when the proposed available payment terms are acceptable to the set of owners.

* * * * *